United States Patent
Koshimae et al.

(10) Patent No.: US 12,487,723 B2
(45) Date of Patent: Dec. 2, 2025

(54) INFORMATION PROCESSING APPARATUS

(71) Applicant: Sony Group Corporation, Tokyo (JP)

(72) Inventors: Hidenari Koshimae, Tokyo (JP); Pál Szász, Lund (SE); Samuel Sjöblom, Malmö (SE); Sara Berg, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/223,068

(22) Filed: Jul. 18, 2023

(65) Prior Publication Data
US 2023/0359318 A1    Nov. 9, 2023

Related U.S. Application Data

(63) Continuation of application No. 16/544,916, filed on Aug. 20, 2019, now abandoned, which is a continuation of application No. 13/841,488, filed on Mar. 15, 2013, now Pat. No. 10,423,290.

(60) Provisional application No. 61/613,804, filed on Mar. 21, 2012.

(51) Int. Cl.
G06F 3/04817 (2022.01)
G06F 3/0481 (2022.01)
G06F 3/04883 (2022.01)

(52) U.S. Cl.
CPC ........ *G06F 3/0481* (2013.01); *G06F 3/04883* (2013.01)

(58) Field of Classification Search
CPC ...................................................... G06F 3/0481
See application file for complete search history.

(56) References Cited

U.S. PATENT DOCUMENTS

| | | |
|---|---|---|
| 5,305,435 A | 4/1994 | Bronson |
| 5,404,442 A | 4/1995 | Foster et al. |
| 5,644,737 A | 7/1997 | Tuniman et al. |
| 5,699,535 A | 12/1997 | Amro |
| 5,784,045 A | 7/1998 | Cline et al. |

(Continued)

FOREIGN PATENT DOCUMENTS

| | | |
|---|---|---|
| EP | 1457869 A2 | 9/2004 |
| EP | 1457869 A3 | 11/2006 |
| JP | 2001290574 A | 10/2001 |

OTHER PUBLICATIONS

Extended European Search Report issued Jul. 17, 2018 in European Application No. 18174079.6-1216.

(Continued)

*Primary Examiner* — Di Xiao
(74) *Attorney, Agent, or Firm* — XSENSUS LLP

(57) ABSTRACT

An information processing apparatus includes a display controller for displaying a first display window which is displayable with a second display window in a display screen in a superposed manner, and an input obtaining unit for obtaining a user's input for moving the first display window in the display screen. The display controller changes, when a user's input for moving the first display window toward an outside of the display screen is obtained in a first display state in which the first display window is displayed in the display screen, a state of the first display window to a second display state in which the first display window is displayed in a region at an end of the display screen in accordance with a direction of the movement of the first display window.

21 Claims, 20 Drawing Sheets

(56) References Cited

U.S. PATENT DOCUMENTS

| | | | |
|---|---|---|---|
| 7,386,801 B1 | 6/2008 | Horvitz et al. | |
| 8,924,894 B1 | 12/2014 | Yaksick et al. | |
| 9,310,989 B2* | 4/2016 | Dehmann | G06F 3/04883 |
| 2004/0103364 A1* | 5/2004 | Dornback | G06F 9/451 |
| | | | 715/201 |
| 2004/0165010 A1 | 8/2004 | Robertson et al. | |
| 2009/0005966 A1 | 1/2009 | McGray et al. | |
| 2009/0164936 A1* | 6/2009 | Kawaguchi | G06F 3/0481 |
| | | | 715/788 |
| 2010/0088634 A1* | 4/2010 | Tsuruta | G06F 3/0481 |
| | | | 715/788 |
| 2010/0257554 A1* | 10/2010 | Friedlander | H04N 21/431 |
| | | | 725/37 |
| 2010/0269136 A1 | 10/2010 | Huang | |
| 2010/0313156 A1 | 12/2010 | Louch et al. | |
| 2011/0074694 A1 | 3/2011 | Rapp et al. | |
| 2011/0087984 A1 | 4/2011 | Jitkoff et al. | |
| 2011/0212430 A1 | 9/2011 | Smithmier et al. | |
| 2012/0054674 A1* | 3/2012 | Beykpour | G06F 3/0481 |
| | | | 715/788 |
| 2012/0131441 A1 | 5/2012 | Jitkoff et al. | |
| 2012/0173976 A1* | 7/2012 | Herz | G06F 3/04815 |
| | | | 715/716 |
| 2012/0185805 A1 | 7/2012 | Louch et al. | |
| 2012/0290973 A1 | 11/2012 | Robertson et al. | |
| 2012/0304133 A1 | 11/2012 | Nan et al. | |
| 2013/0031484 A1 | 1/2013 | Kluttz et al. | |
| 2013/0132885 A1 | 5/2013 | Maynard et al. | |

OTHER PUBLICATIONS

Extended European Search Report Issued Jul. 29, 2013 in Patent Application No. 13159393.1.
Ruth Maran, Maran illustrated Windows 7 (Oct. 1, 2009).

* cited by examiner

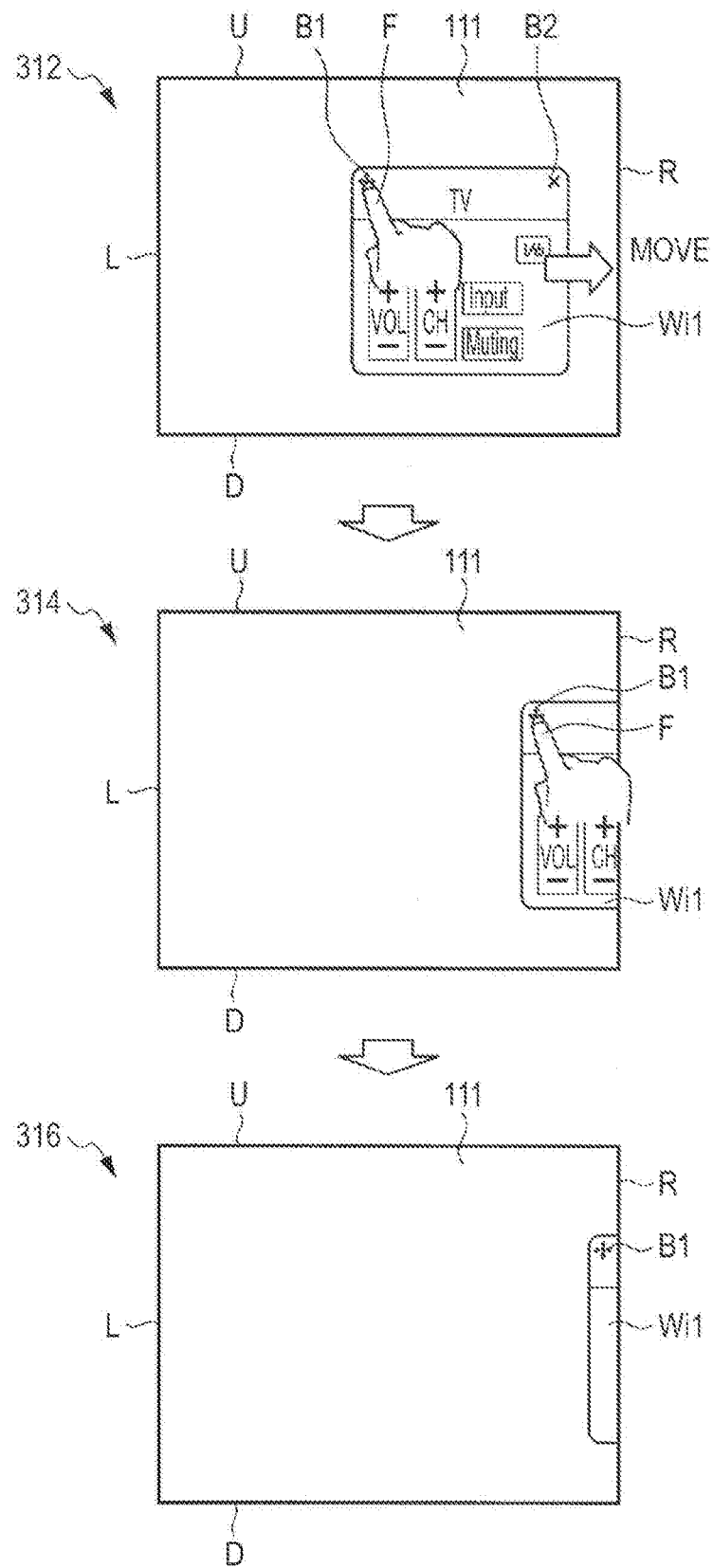

FIG. 10
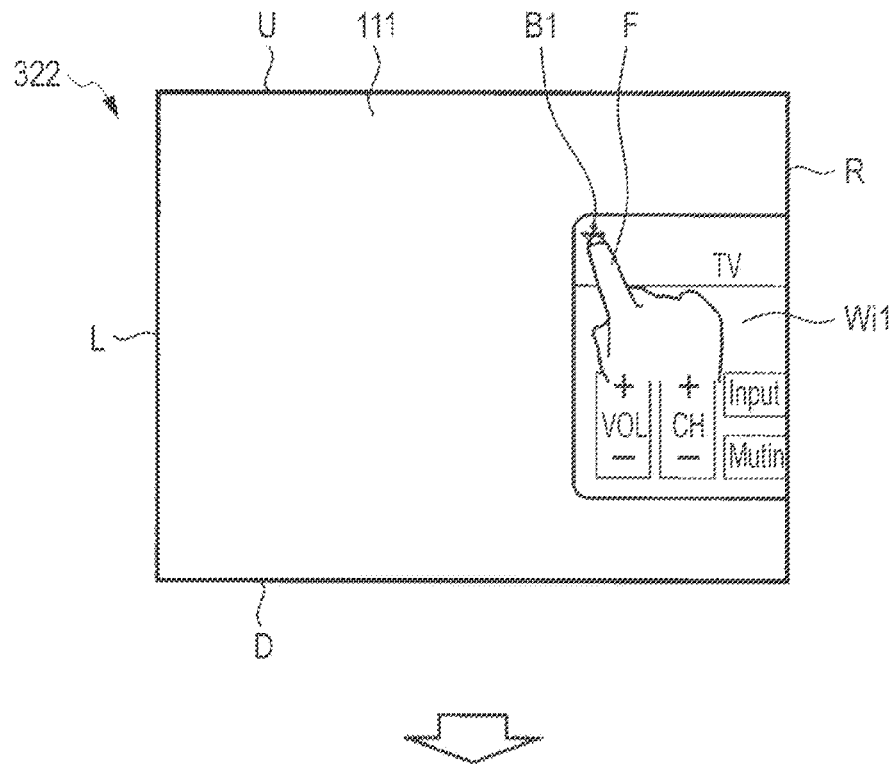
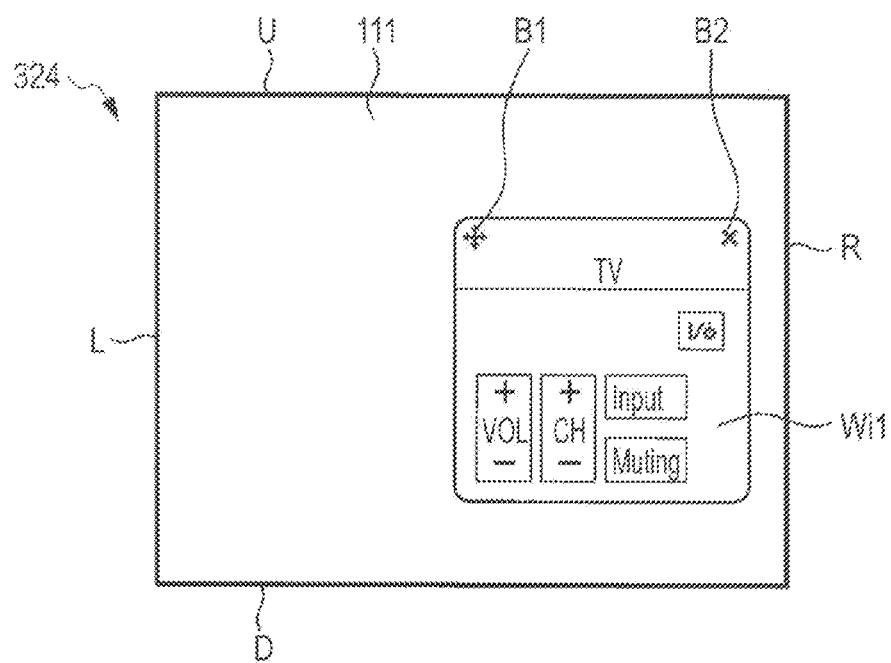

FIG. 11
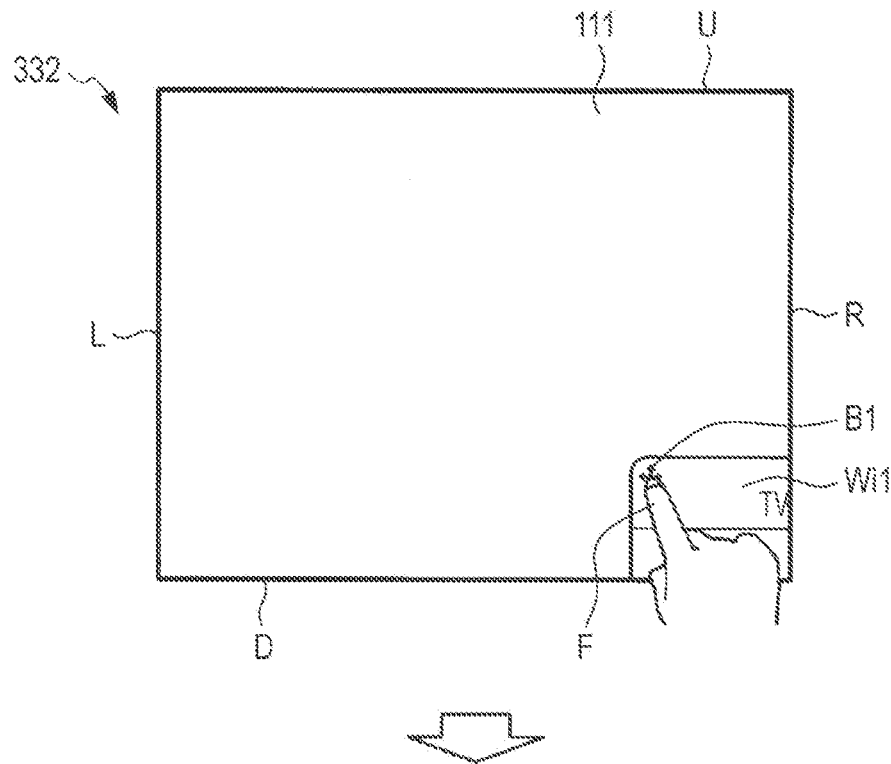
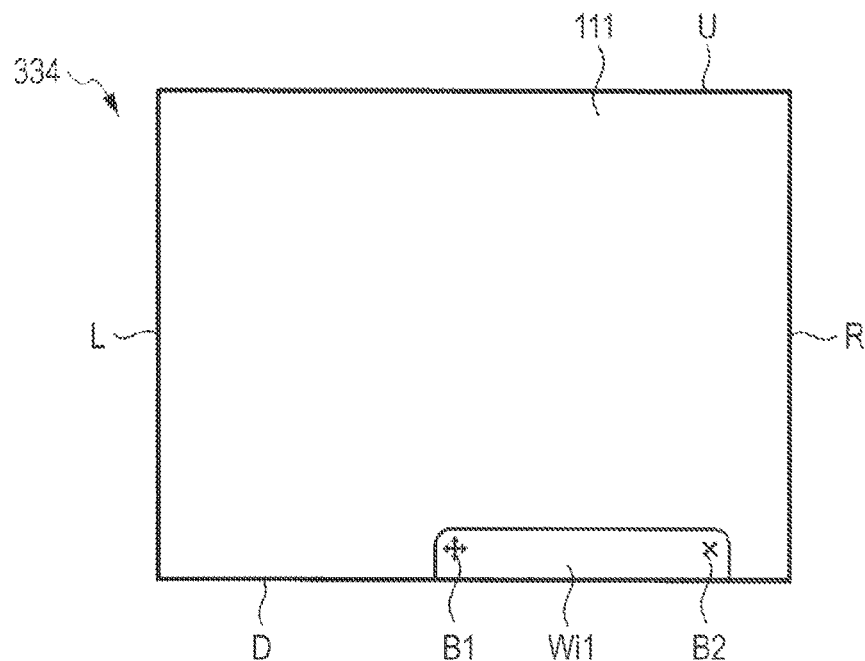

FIG. 18
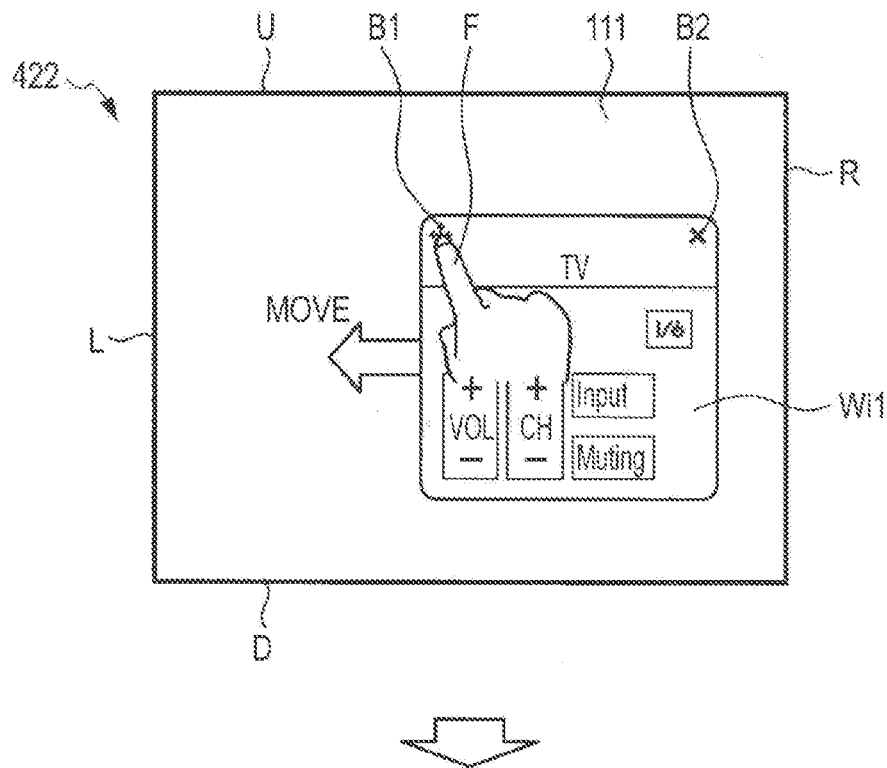
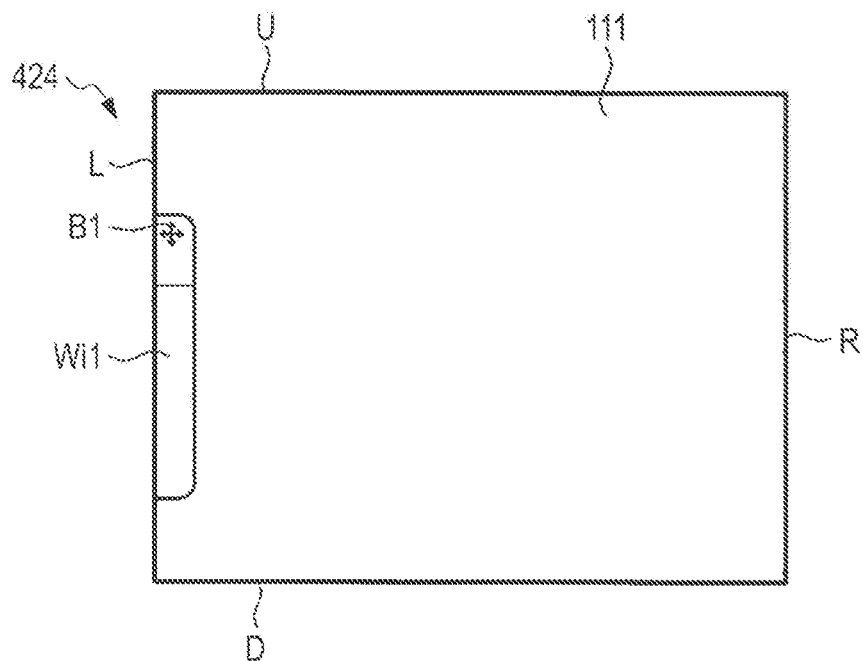

FIG. 19
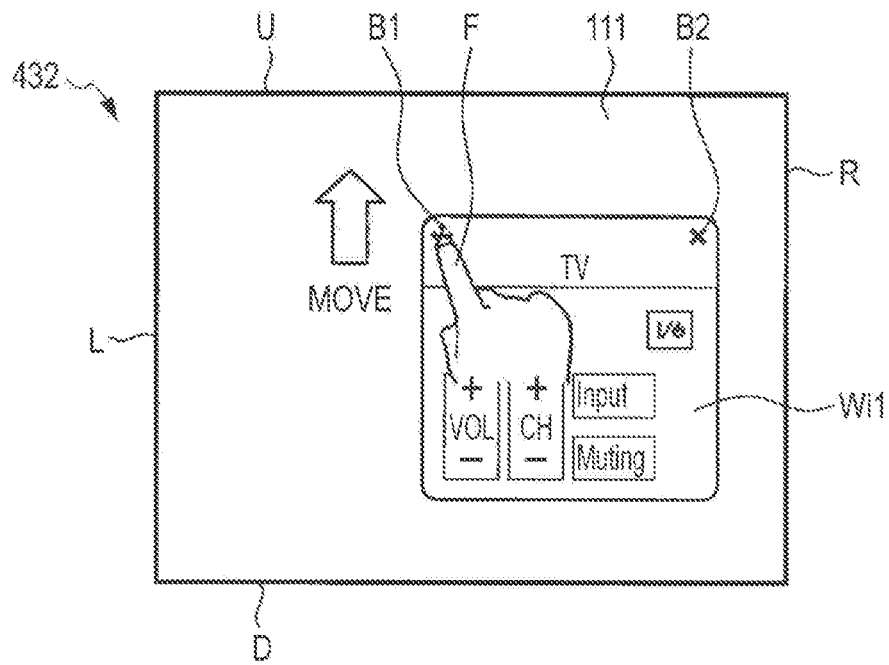
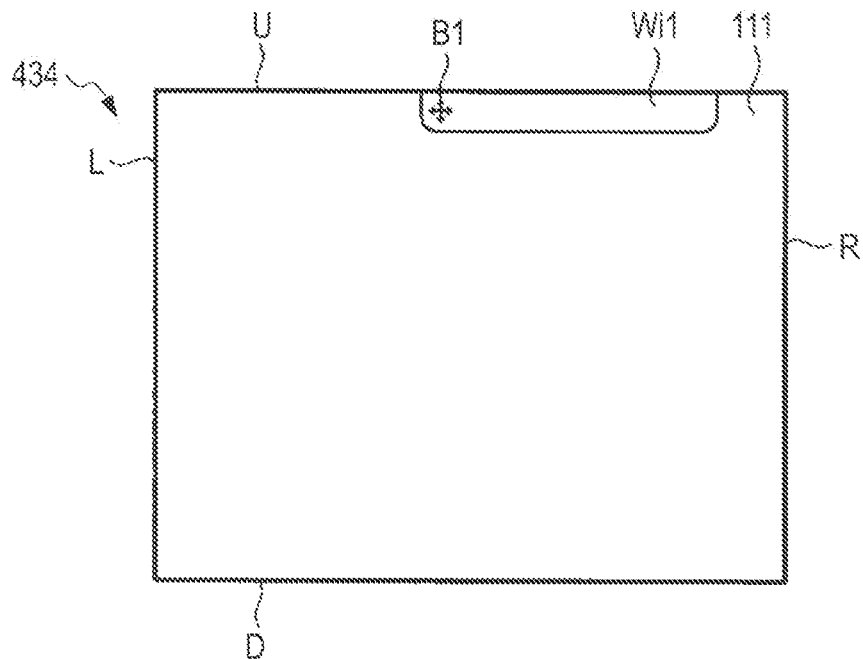

FIG. 20
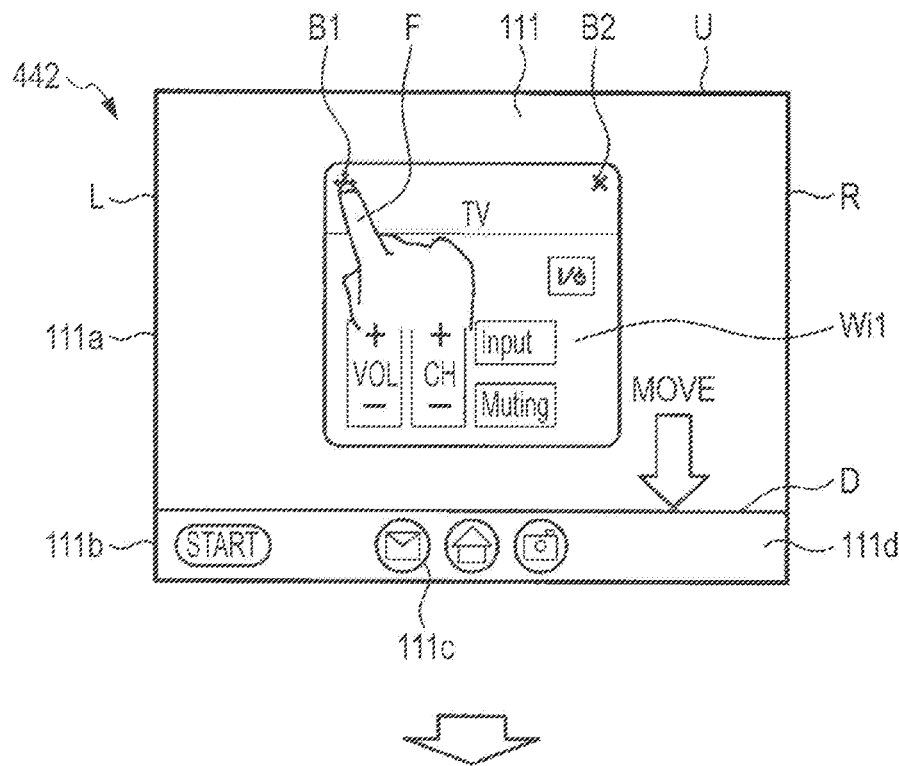
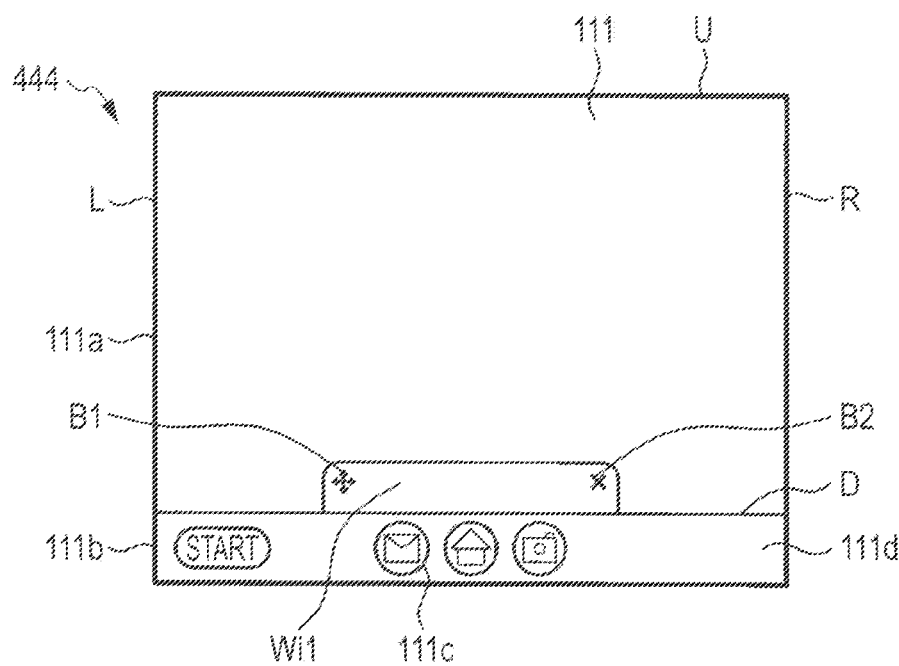

INFORMATION PROCESSING APPARATUS

CROSS-REFERENCE TO RELATED APPLICATIONS

This application is a continuation of U.S. application Ser. No. 16/544,916, filed Aug. 20, 2019, which is a continuation of U.S. application Ser. No. 13/841,488, filed Mar. 15, 2013 (U.S. Pat. No. 10,423,290), which claims priority from Provisional Application No. 61/613,804, filed Mar. 21, 2012, the entire contents of each are incorporated herein by reference.

TECHNICAL FIELD

The present disclosure relates to an information processing apparatus capable of displaying a plurality of display windows which are superposed with each other in a display screen.

BACKGROUND ART

In recent years, portable information terminals such as tablet terminals and smartphones have been widely used as information processing apparatuses. Such a portable information terminal displays a display window corresponding to an application in a display screen to thereby improve usability.

SUMMARY OF INVENTION

In a portable information terminal, from a viewpoint of parallel execution of a plurality of applications, a technique of displaying a plurality of display windows in a display screen in a superposed manner has been proposed.

However, the portable information terminal has a limit of a size of the display screen in terms of portability.

Therefore, when a plurality of display windows are displayed in a superposed manner in a small display screen, it is difficult for a user to perform switching of the plurality of display windows.

In such a background described above, the inventor recognizes a need of an information processing apparatus which allows a user to efficiently operate display windows in a display screen which may display the display windows in a superposed manner.

According to the present disclosure, an information processing apparatus includes a display controller for displaying a first display window which is displayable with a second display window in a display screen in a superposed manner, and an input obtaining unit for obtaining a user's input for moving the first display window in the display screen. The display controller changes, when a user's input for moving the first display window toward an outside of the display screen is obtained in a first display state in which the first display window is displayed in the display screen, a state of the first display window to a second display state in which the first display window is displayed in a region at an end of the display screen in accordance with a direction of the movement of the first display window.

An information processing method according to the present disclosure includes displaying a first display window which is displayable with a second display window in a display screen in a superposed manner, obtaining a user's input for moving the first display window toward an outside of the display screen, and changing, when the user's input is obtained, a state of the first display window to a display state in which the first display window is displayed in a region at an end of the display screen in accordance with a direction of the movement of the display window.

Furthermore, a storage medium according to the present disclosure stores programs which cause a computer to execute displaying a first display window which is displayable with a second display window in a display screen in a superposed manner, obtaining a user's input for moving the first display window toward an outside of the display screen, and changing, when the user's input is obtained, a state of the first display window to a display state in which the first display window is displayed in a region at an end of the display screen in accordance with a direction of the movement of the display window.

According to the present disclosure, the display controller changes, when a user's input for moving the first display window toward an outside of the display screen is obtained in a display state in which the first display window is displayed in the display screen, the state of the first display window to a display state in which the first display window is displayed in a region at an end of the display screen in accordance with a direction of the movement of the first display window. By this, since the display window can be displayed in a desired position at an end of the display screen, operations can be performed on another display window.

BRIEF DESCRIPTION OF DRAWINGS

FIG. 8 is a diagram illustrating transition of the display window Wi1 which enters the minimum state as illustrated in FIG. 6.

FIG. 10 is a diagram illustrating display of the display window Wi1 in a case where a position of the display window Wi1 obtained when a dragging operation is terminated does not satisfy the minimization conditions.

FIG. 11 is a diagram illustrating a minimum state when a dragging operation is performed such that the display window Wi1 protrudes from a lower end D and a right end R of the display screen.

FIG. 18 is a diagram illustrating transition of a display window Wi1 changed to a minimum state according to a fourth embodiment.

FIG. 19 is a diagram illustrating another transition of the display window Wi1 changed to the minimum state according to the fourth embodiment.

FIG. 20 is a diagram illustrating transition of a display window Wi1 changed to a minimum state according to a fifth embodiment.

DESCRIPTION OF EMBODIMENTS

Figure 1:
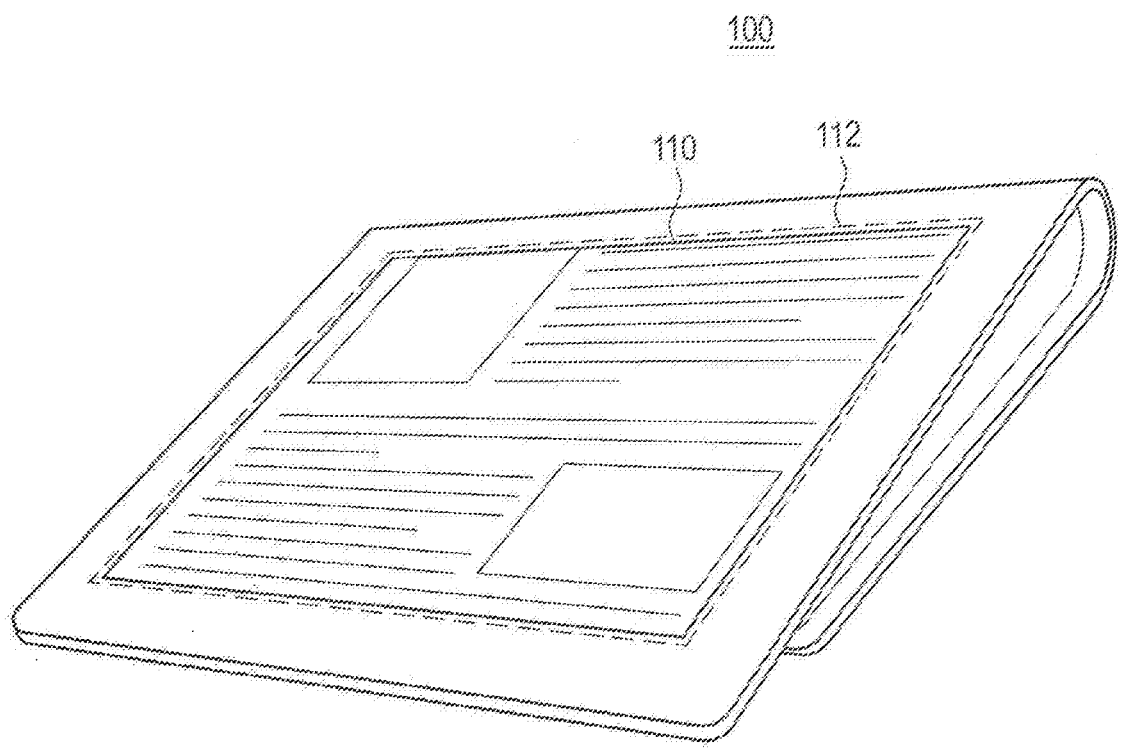
FIG. 1 is a diagram illustrating a configuration of an appearance of a tablet terminal 100 according to a first embodiment of the present disclosure.

Embodiments of the present disclosure will be described hereinafter in detail with reference to the accompanying drawings. Note that, in this specification and the drawings, components having substantially the same functional configurations are denoted by the same reference numerals so that redundant descriptions are avoided.

First Embodiment (Configuration of Information Processing Apparatus)

Figure 2:
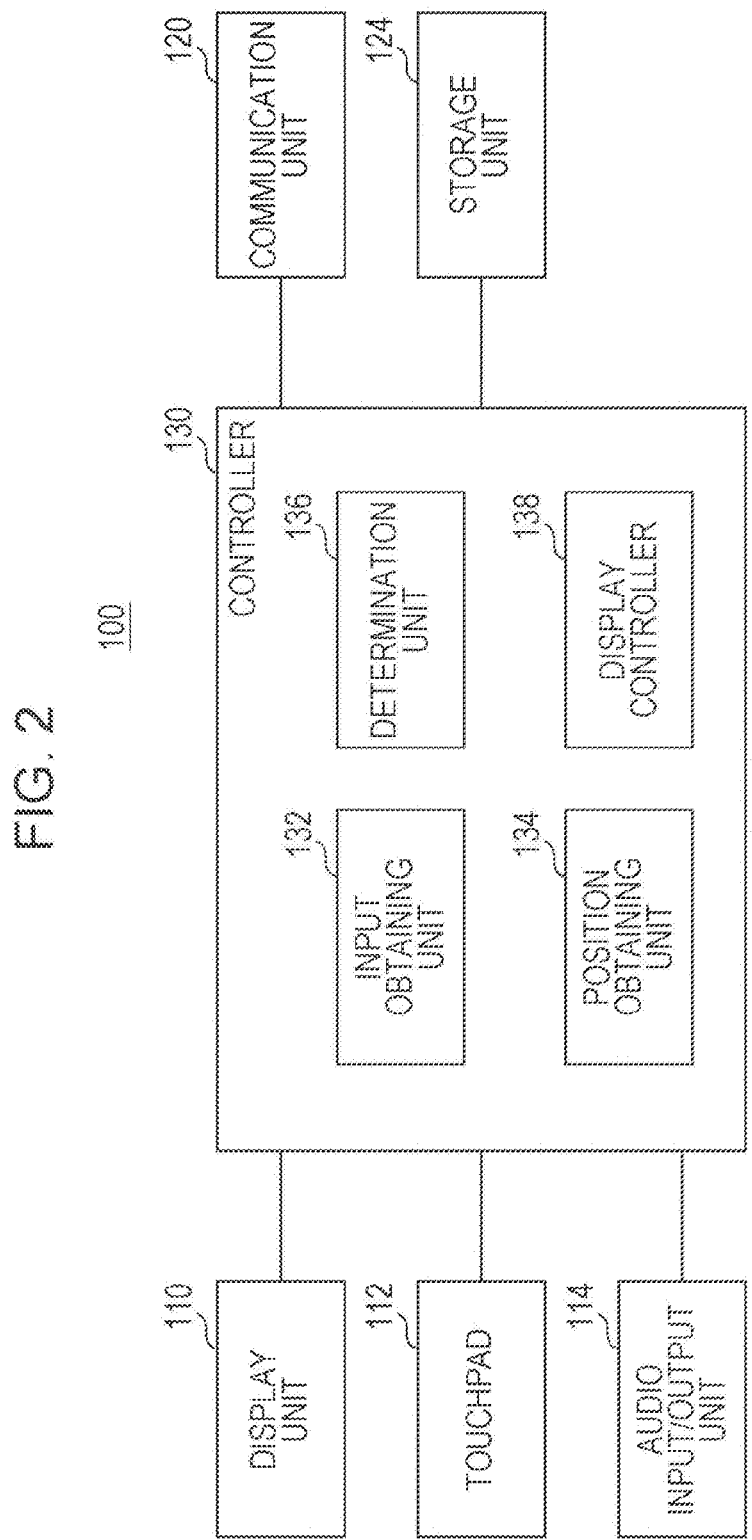
FIG. 2 is a block diagram illustrating a functional configuration of the tablet terminal 100 according to the first embodiment.

A configuration of a tablet terminal 100 which is an example of an information processing apparatus according to a first embodiment of the present disclosure will be described with reference to FIGS. 1 and 2. FIG. 1 is a diagram illustrating a configuration of an appearance of the tablet terminal 100 according to the first embodiment of the present disclosure. FIG. 2 is a block diagram illustrating a functional configuration of the tablet terminal 100 according to the first embodiment.

The tablet terminal 100 is a portable information apparatus carried by a user. The tablet terminal 100 includes a touch panel which allows display of a variety of information and allows input by touch operations. As illustrated in FIG. 2, the tablet terminal 100 includes a display unit 110, a touchpad 112, an audio input/output unit 114, a communication unit 120, a storage unit 124, and a controller 130.

The display unit 110 is a display module, as illustrated in FIG. 1, which is constituted by an LCD (Liquid Crystal Display), an OLED (Organic Light-Emitting Diode), and the like. The display unit 110 includes a display screen 111 used to display a variety of information. The display screen 111 may display a display window corresponding to an application.

Figure 3:
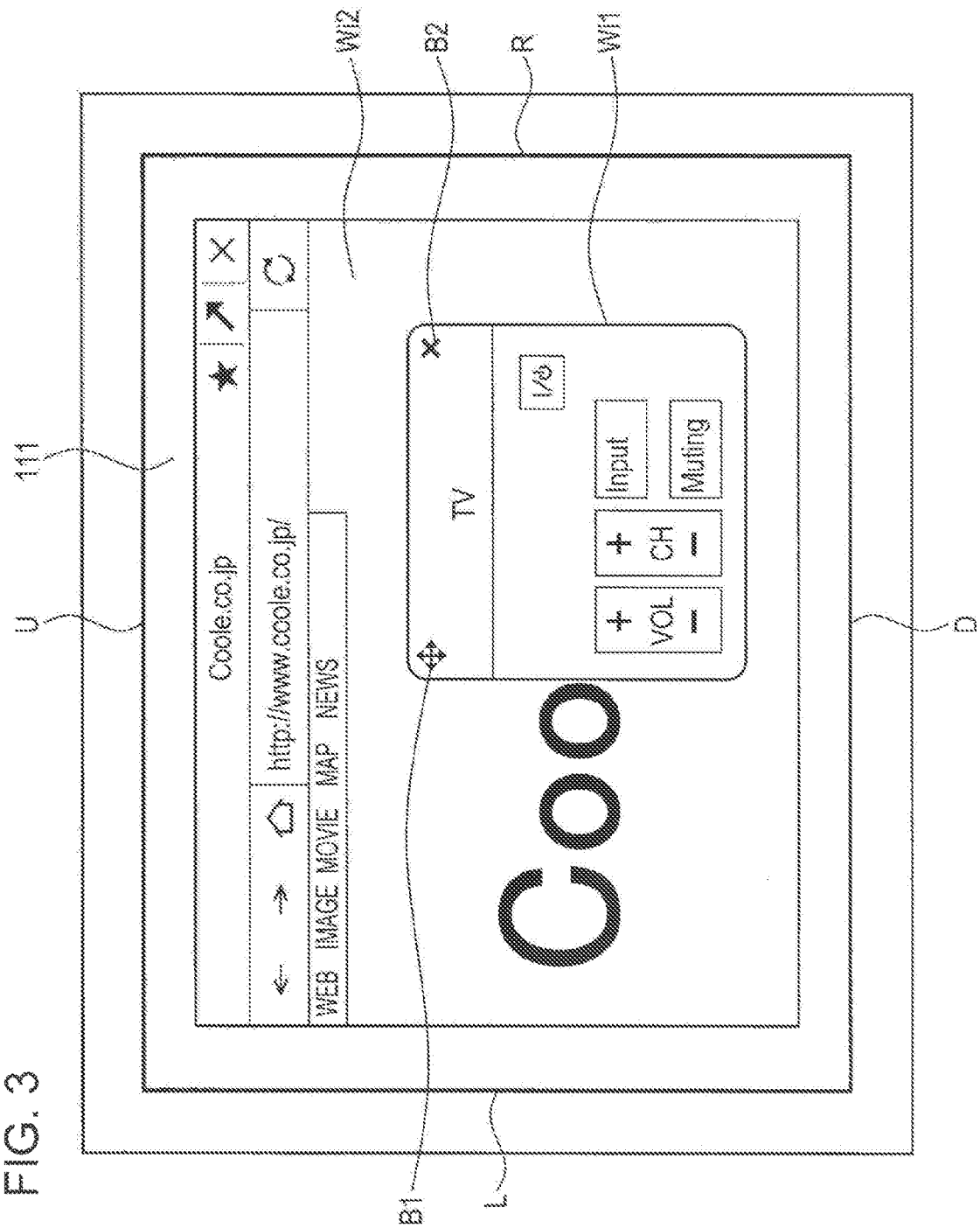
FIG. 3 is a diagram illustrating a display state of a display window according to the first embodiment.

FIG. 3 is a diagram illustrating a display state of a display window according to the first embodiment. The display unit 110 is capable of displaying a plurality of windows in the display screen 111 in a superposed manner. The plurality of windows correspond to respective applications being executed, for example. In FIG. 3, the display screen 111 displays display windows Wi1 and Wi2 which are superposed with each other. Note that, in the display screen 111, the display window Wi1 overlaps on the display window Wi2.

The display window includes GUIs such as operation icons including buttons and bars. For example, as illustrated in FIG. 3, the display window includes a movement icon B1 which is a button used to move the display window and a close icon B2 which is a button used to close the display window. However, the display window according to the first embodiment does not include an icon which is a button used to minimize the display window. In the present disclosure, minimization of the display window is performed by a user's input performed to move the display window to an end of the display screen as described hereinafter.

The touchpad 112 is superposed on the display unit 110 as illustrated in FIG. 1. The touchpad 112 and the display unit 110 are included in the touch panel. The touchpad 112 obtains a touch operation performed by the user. For example, the touchpad 112 obtains an operation of selecting one of the icons included in the display window and obtains a dragging operation and a flicking operation performed on the display window.

Figure 4:
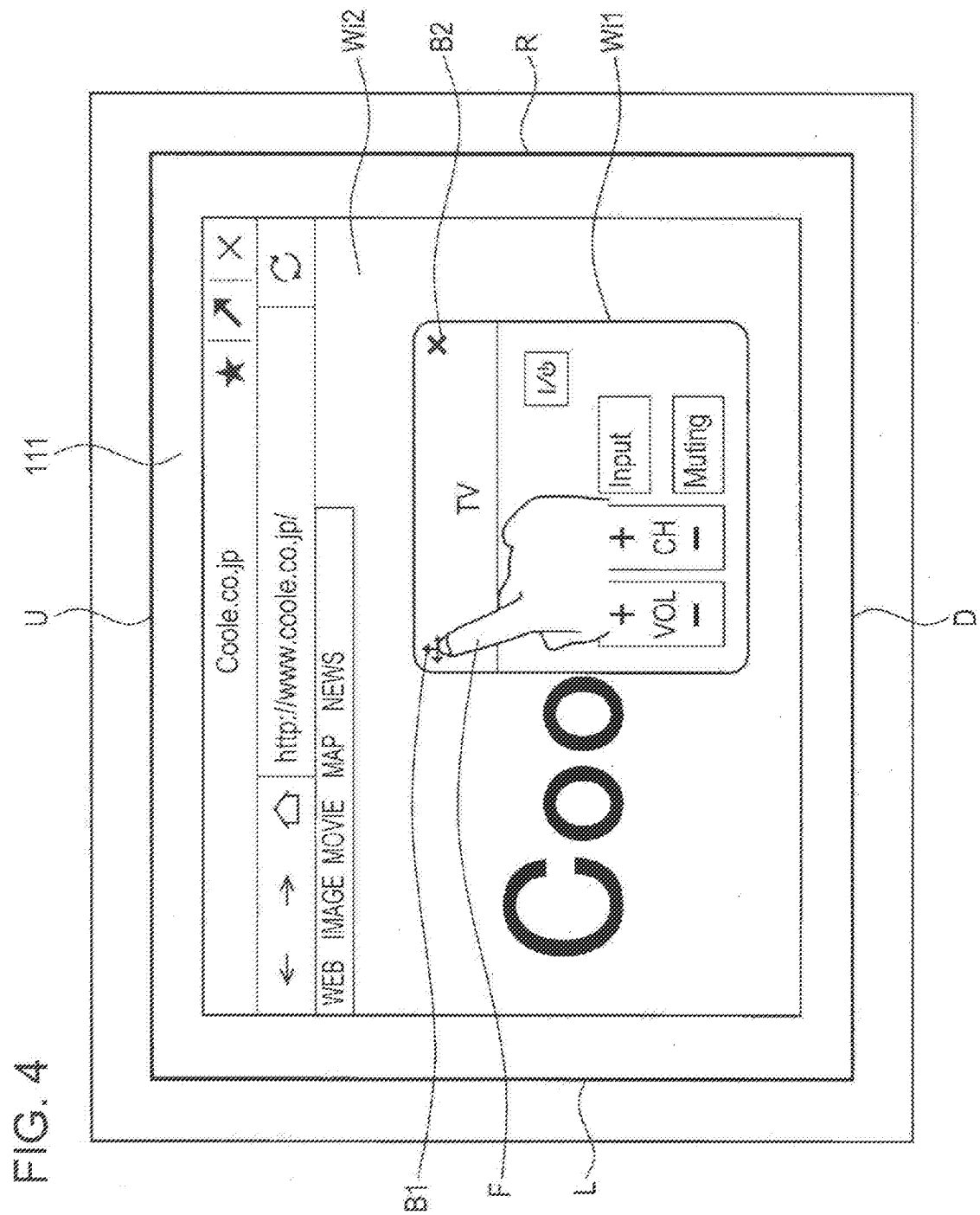
FIG. 4 is a diagram illustrating a touch operation performed by a user of the tablet terminal 100.

FIG. 4 is a diagram illustrating a touch operation performed by the user of the tablet terminal 100. FIG. 4 shows a state in which a user's finger F presses the movement icon B1 included in the display window Wi1. When the user drags the display window Wi1 while pressing the movement icon B1, the display window Wi1 is moved to an end of the screen, for example.

The audio input/output unit 114 outputs audio to an outside by a speaker, for example. Furthermore, the audio input/output unit 114 accepts an input of user's voice by a microphone, for example. To the audio input/output unit 114, a voice of an instruction for minimizing the display window Wi1 in the display screen 111 is input, for example. When the voice of the instruction for minimization is input, the display window Wi1 is moved in a predetermined direction and minimized.

The communication unit 120 is a communication interface which relays communication with another apparatus (such as a keyboard which is an external input device). Furthermore, the communication unit 120 may include a communication device used for connection to a network. The communication unit 120 may download programs to be executed by the controller 130 from a server or the like through the network, for example.

The storage unit 124 stores programs, data, and the like used in processes (such as a process of displaying a display window which will be described hereinafter) performed by the tablet terminal 100. The storage unit 124 is constituted by a storage medium such as a semiconductor memory or a hard disk. Note that the programs may be stored in the storage unit 124 in advance or may be downloaded from the network through the communication unit 120 and temporarily stored in the storage unit 124.

The controller 130 controls operations of the units included in the tablet terminal 100 by executing the programs stored in the storage unit 124. The controller 130 obtains information on user's operation from the touchpad 112. The controller 130 controls display performed by the display unit 110. As illustrated in FIG. 2, the controller 130 includes an input obtaining unit 132, a position obtaining unit 134, a determination unit 136, and a display controller 138.

The input obtaining unit 132 obtains a user's input for moving the display window (for example, the display windows Wi1 and Wi2 illustrated in FIG. 3) in the display screen 111. Note that the user's input corresponds to a touch operation performed to move the display window by the user's finger F touching the display screen 111.

Note that, although it is described that the user's input corresponds to the touch operation in the foregoing description, the user's input is not limited to this. For example, the user's input may be an input of voice of the user who instructs a movement of the display window. Note that examples of the movement of the display window by a voice input include a movement of the display window in a predetermined direction in accordance with a voice input to minimize the display window, for example. Furthermore, the user's input may be an input operation performed by an external input device (such as a keyboard). In this case, the input obtaining unit 132 obtains the input operation through the communication unit 120 which performs wireless communication with the external input device. By this, the user may perform an operation of moving the display window in a location far away from the tablet terminal 100. Furthermore, although the touch operation performed by the user's finger has been described as an example in the foregoing description, the touch operation is not limited to this and the touch operation may be performed by a touch pen, for example.

The position obtaining unit 134 obtains positional information of the display window displayed in the display screen 111. The position obtaining unit 134 obtains positional information of the display window which is moved by a touch operation performed by the user, for example.

The determination unit 136 determines whether a position of the display window which is moved toward an outside of the display screen 111 in accordance with a user's input is included in a predetermined range. For example, the determination unit 136 determines whether the center of the display window protrudes an end of the display screen 111 (first minimization condition). Furthermore, the determination unit 136 determines whether an amount of the protrusion from the end of the screen of the display window is larger than a predetermined threshold value (second minimization condition). As described above, using the two determination conditions, a determination as to whether the position of the moved display window satisfies one of the minimization conditions can be accurately made.

Furthermore, the determination unit 136 determines whether a predetermined user's operation has been performed on the display window which is in a minimum state to cancel the minimization. Note that the predetermined user's operation corresponds to an operation of moving the display window which is in the minimum state to the center of the display screen 111. Thereafter, the determination unit 136 determines whether an amount of the movement of the display window which is in the minimum state toward the center of the display screen 111 is larger than a predetermined threshold value.

The display controller 138 displays a display window which is displayable with another display window in the display screen 111 in a superposed manner. Specifically, the display controller 138 displays a plurality of display windows in the display screen 111 in a superposed manner. When a user's input for moving a first display window toward an outside of the display screen 111 is obtained in a first display state in which the first display window is displayed in the display screen (normal state illustrated in FIG. 3), the display controller 138 changes the first display state to a second display state (minimum state) in which the first display window is displayed in a region at an end of the display screen 111 determined in accordance with a direction of a movement of the first display window. By this, the display window may be minimized by a simple operation in a user's desired position.

The display controller 138 does not superpose the first display window which is displayed in the minimum state in the region at the end of the display screen 111 with a second window which is entirely displayed in the display screen 111. Note that the present technique is not limited to this, and the display controller 138 may minimize the first display window to be displayed in the minimum state so that the first display window is superposed with a portion of the second window. By this, in the state in which the first display window is minimized, the user may recognize the second display window and may appropriately perform an operation on the second display window.

The display controller 138 changes the state of the display window to the second display state when the determination unit 136 determines that the position of the first display window is included in the predetermined range (that is, when one of the minimization conditions is satisfied). Specifically, the display controller 138 changes the state of the display window to the second display state when it is determined that the center of the first display window protrudes the end of the screen. Alternatively, the display controller 138 changes the state of the display window to the second display state when it is determined that the amount of the protrusion of the first display window from the end of the screen is larger than the predetermined threshold value. In this way, the display window may be minimized in a user's desired position irrespective of the size of the display screen.

The display controller 138 changes the minimum state of the display window to the normal state when determining that a predetermined user's operation has been performed on the display window which is in the minimum state. Specifically, the display controller 138 changes the state of the display window to the normal state when it is determined that the amount of the movement of the display window which is in the minimum state toward the center of the display screen is larger than a threshold value. In this way, cancellation of the minimum state caused by an inappropriate operation performed by the user can be prevented.

Display Example of Display Window

A display example of the display window in the display screen 111 will be described in detail. Hereinafter, a display example of the display window which is in the minimum state, an example of transition to the minimum state of the display window, and an example of cancellation of the minimization of the display window will be described in this order.

Display Example of Display Window in Minimum State

First, a display example of the display window which is in the minimum state according to the first embodiment will be described with reference to FIGS. 5 and 6.

Figure 5:
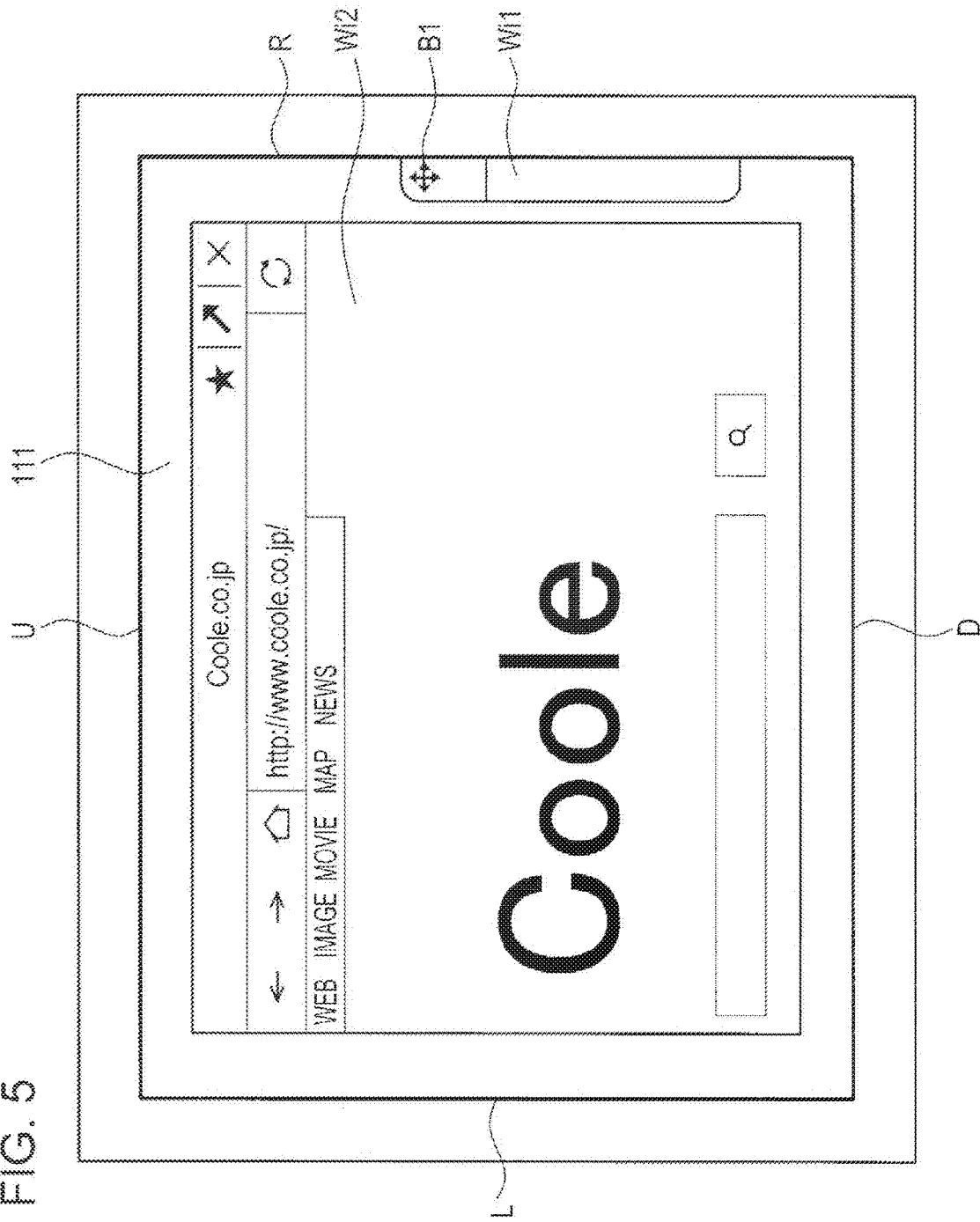
FIG. 5 is a diagram illustrating a minimum state of a display window Wi1 in a display screen.

FIG. 5 is a diagram illustrating the minimum state of the display window Wi1 in the display screen 111. FIG. 5 shows a state in which the display window Wi1 is minimized at a right end R of the display screen. The display window Wi1 minimized at the right end R does not overlap with the display window Wi2. Therefore, the user may recognize the entire display window Wi2 and may perform a desired touch operation on the display window Wi2.

Figure 6:
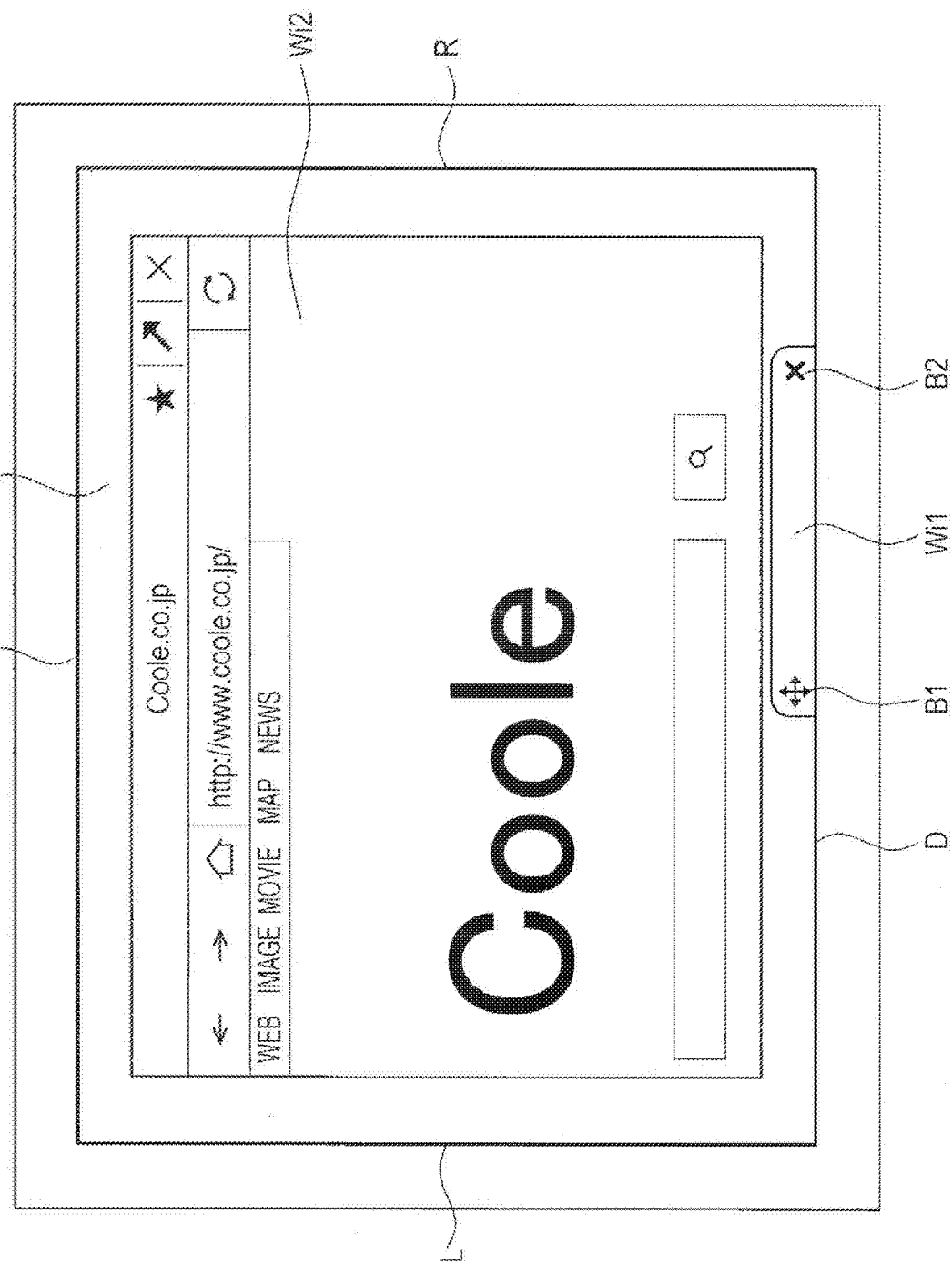
FIG. 6 is a diagram illustrating another minimum state of the display window Wi1 in the display screen.

FIG. 6 is a diagram illustrating another minimum state of the display window Wi1 in the display screen. FIG. 6 shows a state in which the display window Wi1 is minimized at a lower end D of the display screen. The display window Wi1 minimized at the lower end D does not overlap with the display window Wi2. Therefore, the user may recognize the entire display window Wi2 and may perform a desired touch operation on the display window Wi2.

Note that, although the display window Wi1 is minimized at the right end R or the lower end D of the display screen in the foregoing description, the present technique is not limited to this. As described below, the display window Wi1 may be minimized at a left end L or an upper end U of the display screen. In this case, the display window Wi1 may be minimized in an arbitrary position at the end of the display screen 111 depending on a display state of the display window Wi2 displayed behind the display window Wi1. Accordingly, the user may appropriately recognize the entire display window Wi2 and may perform a desired touch operation on the display window Wi2.

Example of Transition to Minimum State of Display Window

Next, an example of transition to the minimum state of the display window will be described with reference to FIGS. 7 and 8.

Figure 7:
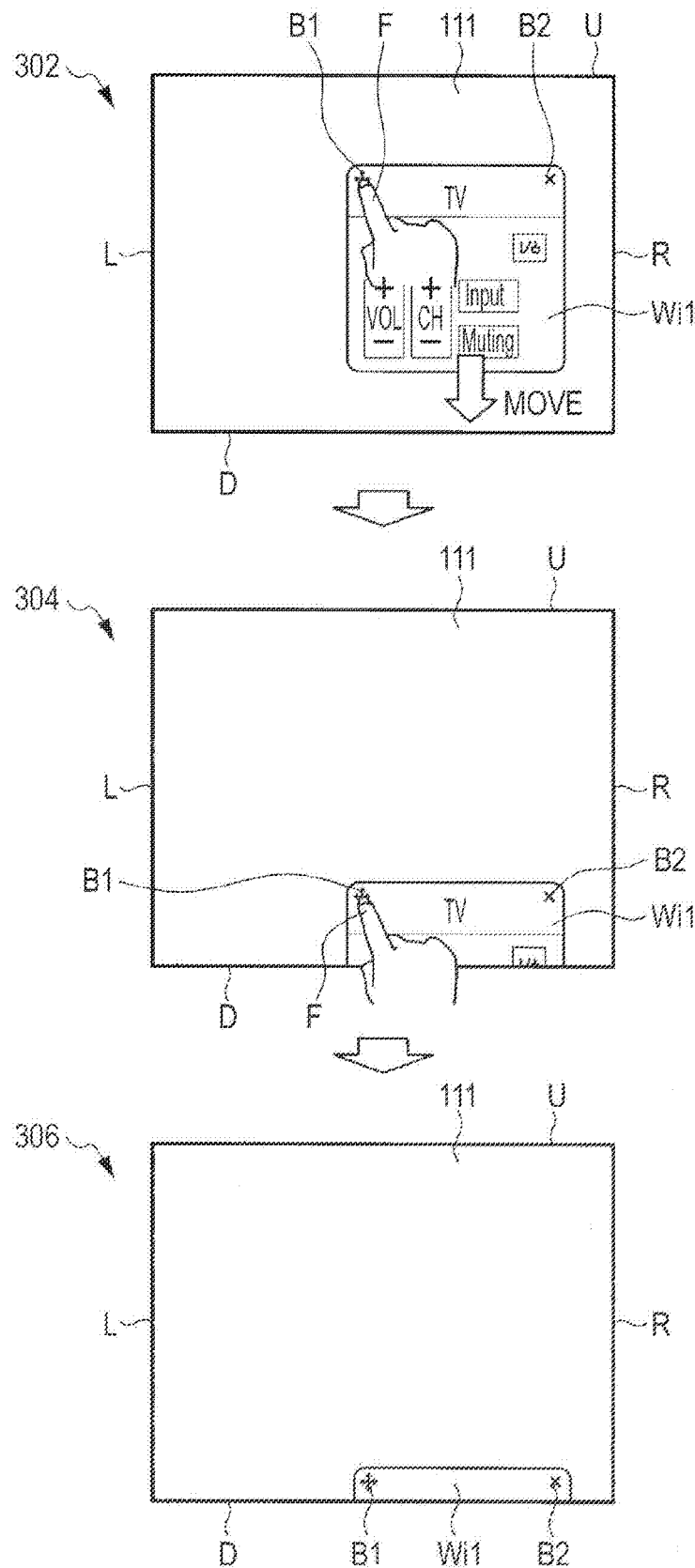
FIG. 7 is a diagram illustrating transition of the display window Wi1 which enters the minimum state as illustrated in FIG. 5.

FIG. 7 is a diagram illustrating transition to the minimum state of the display window Wi1 illustrated in FIG. 5. Note that in FIG. 7, the display window Wi2 is not shown for convenience of description. As illustrated in FIG. 7, the user performs a dragging operation toward the lower end D of the display screen 111 while touching the movement icon B1 of the display window Wi1 by the finger F (state 302). Thereafter, when a position of the display window Wi1 obtained at a time when the dragging operation is terminated satisfies one of the predetermined minimization conditions (state 304), the display controller 138 changes the state of the display window Wi1 to the minimum state (state 306).

FIG. 8 is a diagram illustrating transition to the minimum state of the display window Wi1 illustrated in FIG. 6. Also in FIG. 8, the display window Wi2 is not shown for convenience of description. As illustrated in FIG. 8, the user performs a dragging operation toward the right end R of the display screen 111 while touching the movement icon B1 of the display window Wi1 by the finger F (state 312). Thereafter, when a position of the display window Wi1 obtained at a time when the dragging operation is terminated satisfies one of the predetermined minimization conditions (state 314), the display controller 138 changes the state of the display window Wi1 to the minimum state (state 316).

Note that, as illustrated in FIGS. 7 and 8, the display controller 328 displays, when changing the state of the display window Wi1 to the minimum state, a portion of the display window Wi1 in a region at the end of the display screen 111 while the size of the display window Wi1 is maintained. By this, the user may easily recognize the minimized display window Wi1.

Figure 9A:
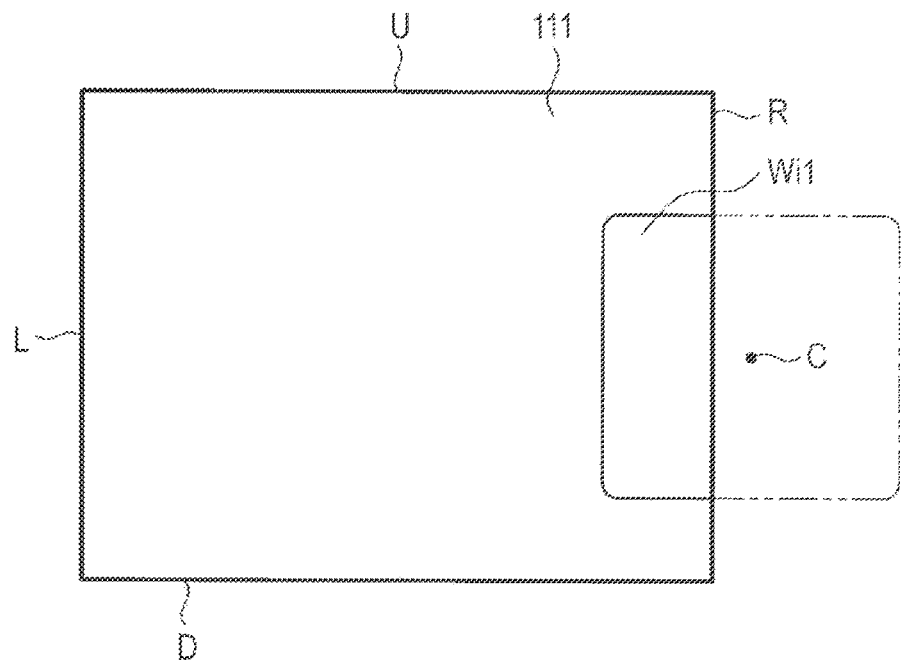
FIGS. 9(*a*) and 9(*b*) are diagrams schematically illustrating minimization conditions of the display window Wi1.
Figure 9B:
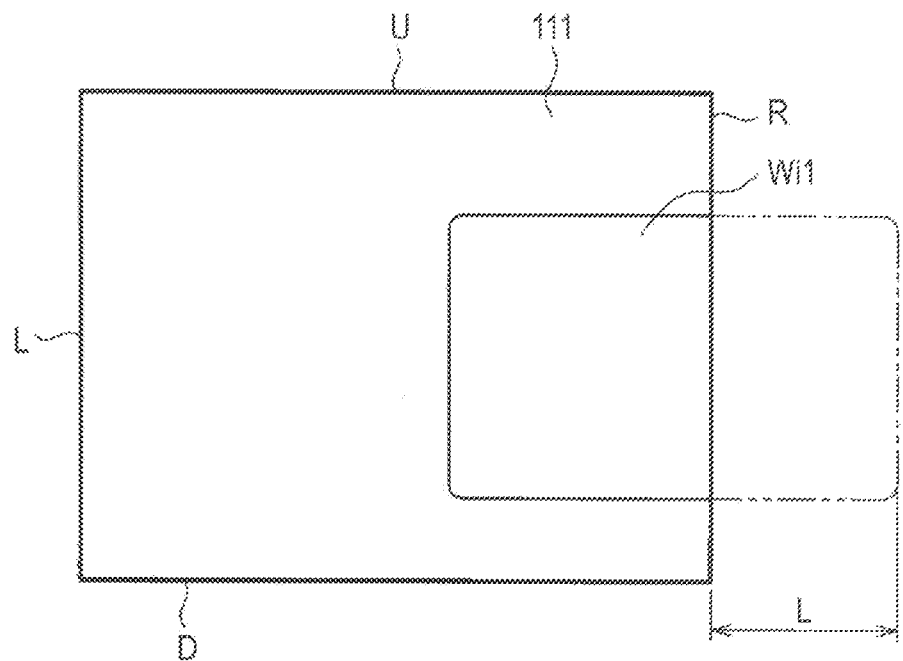

Examples of the conditions for minimizing the display window Wi1 will be described with reference to FIGS. 9(a) and 9(b). FIGS. 9(a) and 9(b) are diagrams schematically illustrating the conditions for minimizing the display window Wi1. Note that a size of the display window Wi1 illustrated in FIG. 9(b) is different from a size of the display window Wi1 illustrated in FIG. 9(a) for convenience of description.

In this embodiment, there are two conditions for minimizing the display window Wi1, that is, the first and second minimization conditions. When one of the first and second minimization conditions is satisfied, the display window is minimized.

The first minimization condition is a case where a position of a center C of the display window Wi1 obtained at a time when the dragging operation is terminated protrudes out of the display screen as illustrated in FIG. 9(a). The second minimization condition is a case where an amount of the protrusion of the display window Wi1 out of the display screen obtained at the time when the dragging operation is terminated is larger than a predetermined threshold value as illustrated in FIG. 9(b). Note that the predetermined threshold value of the second minimization condition is set according to the size of the display screen 111. Specifically, the threshold value may be set in a unit of pixel and the threshold value is set to 200 pixels, for example.

By setting the two minimization conditions as described above, the minimization of the display window Wi1 is appropriately performed irrespective of the size of the display window Wi1. The first minimization condition is effective when the size of the display window Wi1 is small whereas the second minimization condition is effective when the size of the display window Wi1 is large.

On the other hand, when the position of the display window Wi1 obtained at the time when the dragging operation is terminated does not satisfy any of the first and second minimization conditions, the display window Wi1 is moved toward and displayed near the center of the display screen as illustrated in FIG. 10.

FIG. 10 is a diagram illustrating display of the display window Wi1 in a case where a position of the display window Wi1 obtained at the time when a dragging operation is terminated does not satisfy any of the minimization conditions. In FIG. 10, since the amount of the protrusion of the display window Wi1 out of the display screen 111 (specifically, out of the right end R) obtained at the time when the dragging operation is terminated is small (state 322), any of the first and second minimization conditions is not satisfied. In this case, it is determined that the dragging operation is not performed for minimization on the display window Wi1, and the display window Wi1 is moved toward and displayed near the center of the display screen 111 (state 324). Therefore, when a touch operation is not performed on the display window and when the state of the display window is other than the minimum state, the entire display window is displayed in the display screen 111 (or a portion of the display window is protrude from the display screen 111).

Note that, in the foregoing description, the case where the dragging operation is performed so that the display window Wi1 protrudes from the lower end D or the right end R of the display screen is described as illustrated in FIGS. 7 and 8. However, when the display window Wi1 is dragged, the display window Wi1 may simultaneously protrude from ends of two sides (the lower end D and the right end R, for example). Furthermore, one of the minimization conditions (the first or second minimization condition) may be satisfied at the ends of the two sides (the lower end D and the right end R). In this embodiment, priority for minimization of the display window Wi1 is assigned to the two sides. When one of the minimization conditions is satisfied at the two sides, the display window Wi1 is minimized at one of the sides having high priority.

FIG. 11 is a diagram illustrating a minimum state when a dragging operation is performed on the display window Wi1 such that the display window Wi1 protrudes from the lower end D and the right end R of the display screen. In FIG. 11, the position of the display window Wi1 obtained at the time when the dragging operation is terminated satisfies one of the minimization conditions at the lower end D and the right end R (state 332). Here, the lower end D has higher priority for minimization of the display window than the right end R in the display screen. Therefore, the display window Wi1 is displayed in the minimum state at the lower end D selected from between the lower end D and the right end R (state 334).

Example of Transition to Cancellation of Minimization of Display Window

Next, examples of transition to cancellation of the minimum state of the display window will be described with reference to FIGS. 12 and 13.

It is assumed that the user drags the display window which is in the minimum state toward the center of the display screen before cancelling the minimum state of the display window. Then, when a movement direction (dragging direction) of the display window Wi1 at the time when the dragging operation is terminated satisfies a predetermined cancellation condition, the minimum state is cancelled. On the other hand, when a distance of the movement in the direction of the display window Wi1 obtained at the time when the dragging operation is terminated does not satisfy the predetermined cancellation condition, the minimum state of the display window Wi1 is maintained. In this way, cancellation of the minimum state of the display window Wi1 caused by an inappropriate operation performed by the user is prevented.

Here, the cancellation condition is a case where a distance of a movement in a certain direction of the display window Wi1 by a dragging operation is larger than a predetermined threshold value. Specifically, the threshold value of the cancellation condition may be also set in a unit of pixel and the threshold value is set to 20 pixels, for example.

Figure 12:
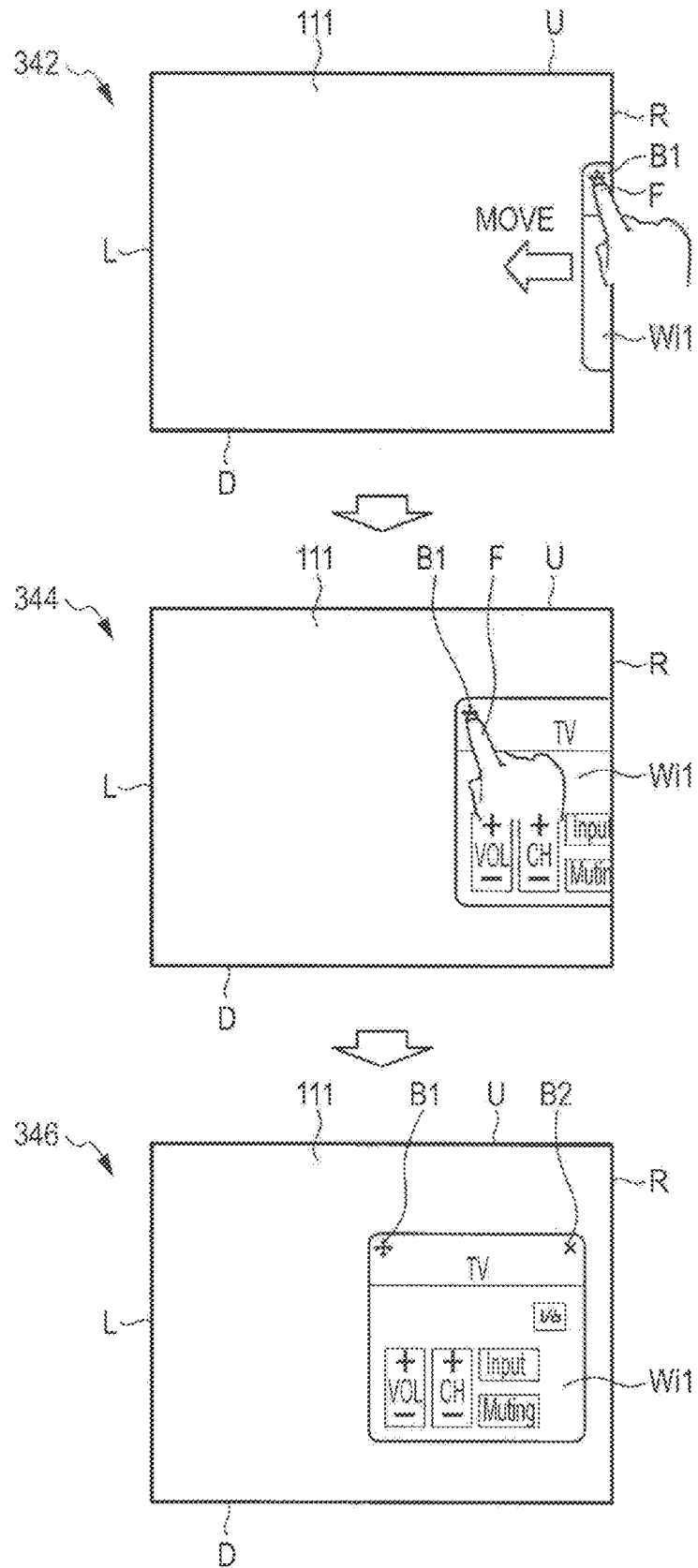
FIG. 12 is a diagram illustrating transition of cancellation of the minimization of the display window Wi1 which is in the minimum state.

FIG. 12 is a diagram illustrating transition to cancellation of the minimum state of the display window Wi1 which is in the minimum state. Note that, in FIG. 12, the display window Wi2 is not shown for convenience of description. As illustrated in FIG. 12, the user performs a dragging operation on the display window Wi1 which is minimized at the right end R of the display screen 111 toward the center of the display screen 111 while touching the movement icon B1 of the display window Wi1 (state 342). By this, the display window Wi1 is displayed in the display screen in an enlarged manner. Note that, in FIG. 12, the dragging operation is terminated before the entire display window Wi1 is displayed (state 344).

Thereafter, when a distance (distance in a longitudinal direction of the display screen in FIG. 12) in the movement direction of the display window Wi1 obtained at the time when the dragging operation is terminated satisfies the cancellation condition, the display window Wi1 moves toward the center of the display screen 111 and the entire display window Wi1 is displayed (state 346). Therefore, the user is capable of performing a desired operation on the display window Wi1. Note that when the distance in the movement direction of the display window Wi1 obtained at the time when the dragging operation is terminated does not satisfy the cancellation condition, the display window Wi1 moves in a direction opposite to the dragging direction (toward the right end of the display screen 111) and returns to the minimum state.

Figure 13:
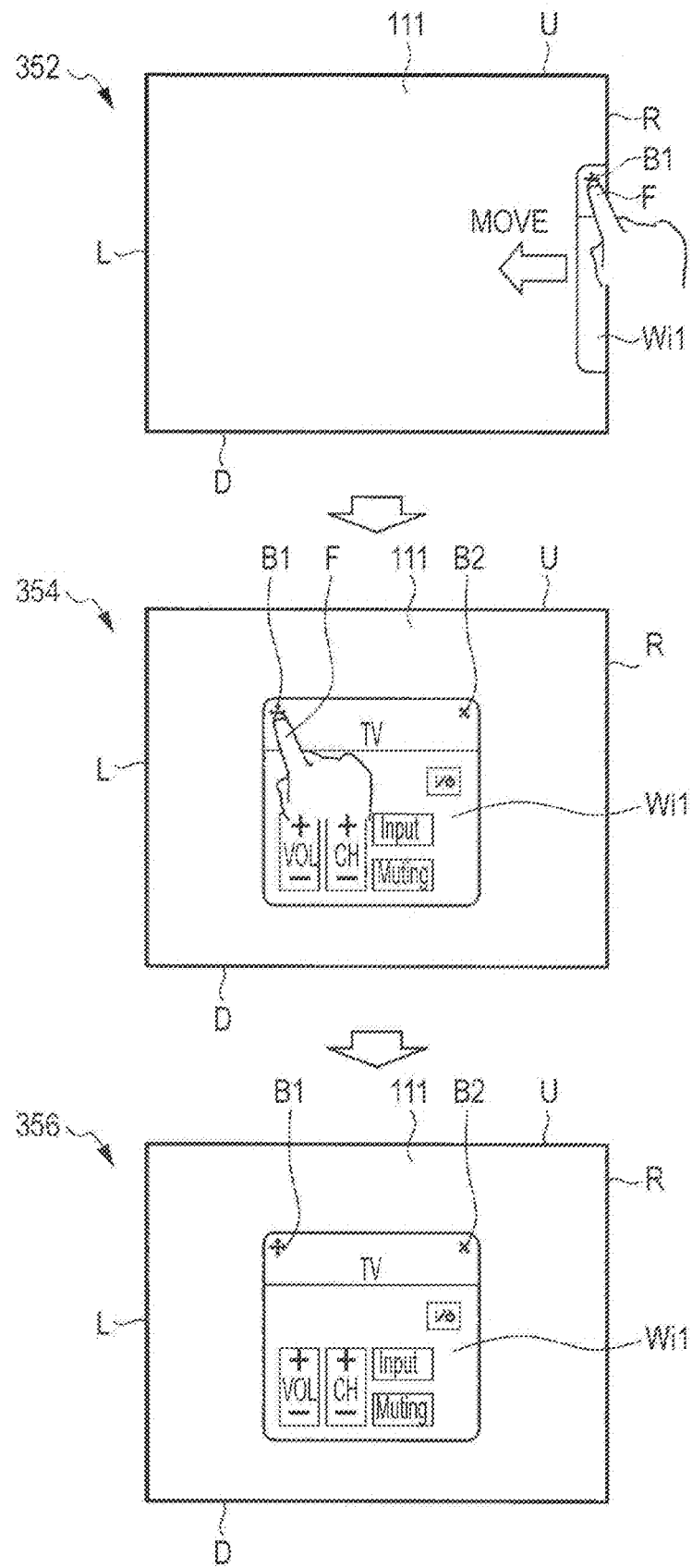
FIG. 13 is a diagram illustrating another transition of cancellation of the minimization of the display window Wi1 which is in the minimum state.

FIG. 13 is a diagram illustrating another transition to cancellation of the minimization of the display window Wi1 which is in the minimum state. Also in FIG. 13, the user performs a dragging operation on the display window Wi1 which is minimized and which is displayed at the right end R of the display screen toward the center of the display screen while touching the movement icon B1 of the display window Wi1 (state 352). Note that, unlike the case of FIG. 12, the dragging operation is continued until the entire display window Wi1 is displayed (state 354) in FIG. 13.

Also in this case, a distance in the movement direction of the display window Wi1 obtained at the time when the dragging operation is terminated (distance in the longitudinal direction of the display screen in FIG. 13) satisfies the cancellation condition. Then the display window Wi1 is displayed in a position where the dragging operation is terminated (state 356). In the case of FIG. 13, unlike the case of FIG. 12, the display window Wi1 can be displayed in a user's desired position in a state in which the minimum state of the display window Wi1 is cancelled.

(Display Process of Display Window)

An example of an operation of the tablet terminal 100 performed when display control is performed on the display window will be described. Hereinafter, a process of minimizing the display window will be described, and thereafter, a process of cancelling a minimum state of the display window will be described.

(Process of Minimizing Display Window)

Figure 14:
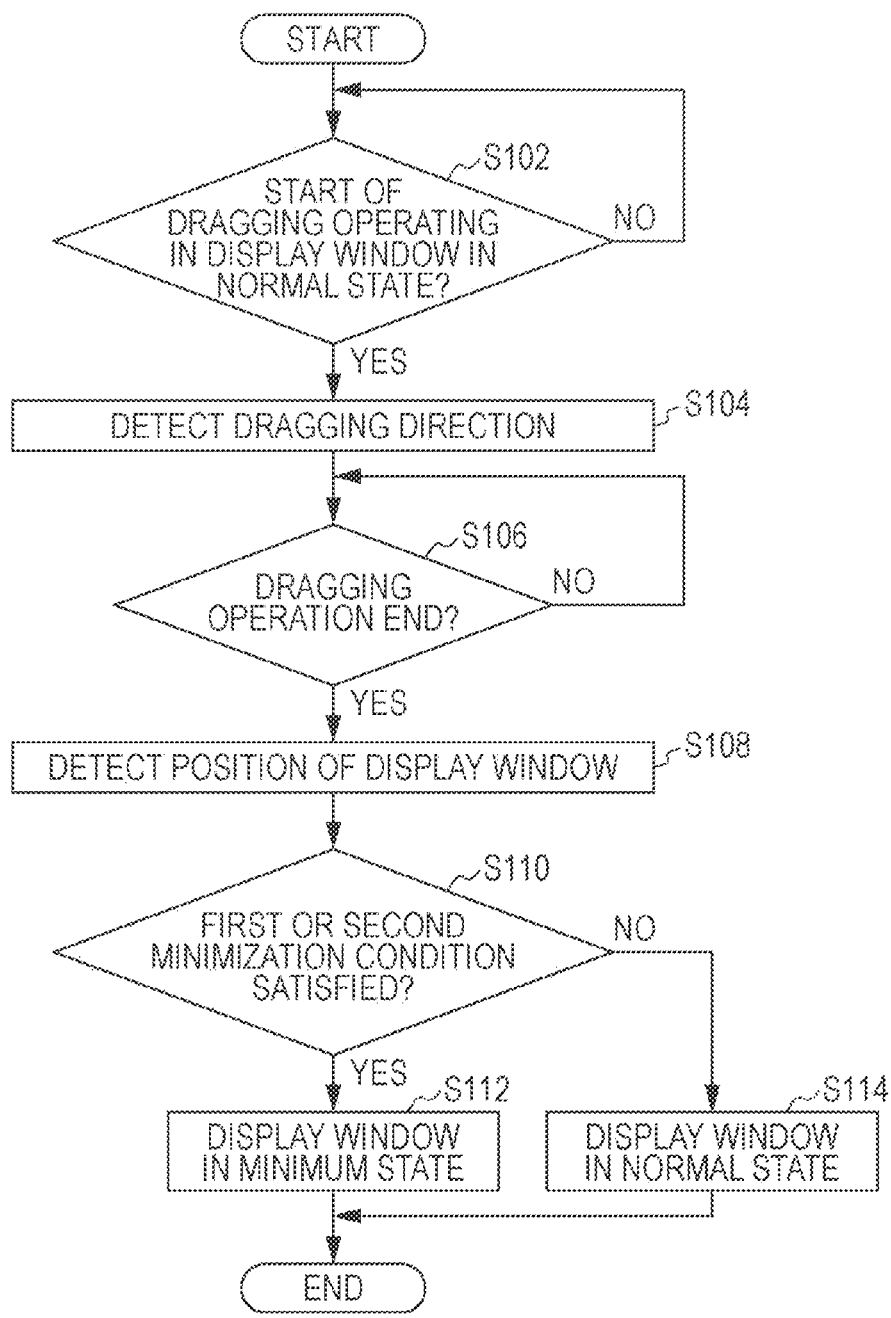
FIG. 14 is a flowchart illustrating a process of minimizing the display window.

FIG. 14 is a flowchart illustrating a process of minimizing the display window. This process is realized when the controller 130 executes a program stored in the storage unit 124. The flowchart of FIG. 14 is started in a state in which a plurality of display windows are displayed in a superposed manner in the display screen 111.

First, the controller 130 determines whether the user has started an operation of dragging a display window displayed in the most front side of the display screen 111 (the display window Wi1 illustrated in FIG. 4, for example) (in step S102). Specifically, the controller 130 determines whether the user is performing a dragging operation while touching the movement icon B1 of the display window. When it is determined that the dragging operation has been started (that is, when the determination is affirmative) in step S102, the controller 130 detects a direction of dragging of the display window (in step S104).

Next, the controller 130 determines whether the operation of dragging the display window has been terminated (in step S106). When it is determined that the dragging operation has been terminated (that is, when the determination is affirmative) in step S106, the controller 130 detects a position of the display window at a time when the dragging operation is terminated (in step S108).

Next, the controller 130 determines whether the position of the display window at the time when the dragging operation is terminated satisfies the first minimization condition or the second minimization condition (in step S110). When it is determined that the first minimization condition or the second minimization condition is satisfied (that is, when the determination is affirmative) in step S110, the controller 130 further moves the display window to an end of the display screen 111 in the dragging direction detected in step S104 (refer to FIGS. 7 and 8) and makes the display window be the minimum state (in step S112).

On the other hand, when it is determined that neither the first minimization condition nor the second minimization condition are not satisfied (that is, when the determination is negative) in step S110, the controller 130 moves the display window toward a direction opposite to the dragging direction (refer to FIG. 10) and returns a state of the display window to the normal state in which the display window is displayed in the display screen (in step S114). In this way, this process is terminated.

(Process of Cancelling Minimum State of Display Window)

Figure 15:
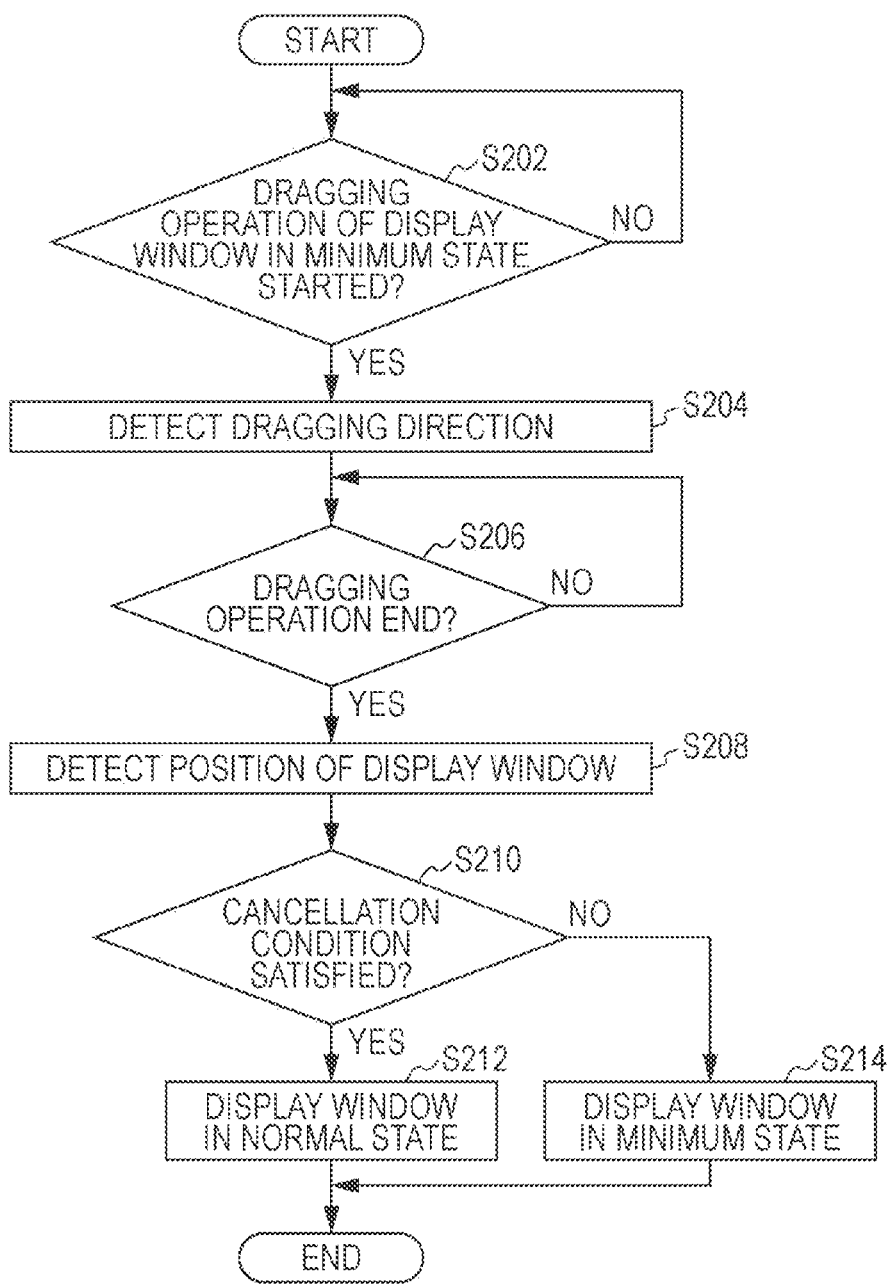
FIG. 15 is a flowchart illustrating a process of cancelling the minimum state of the display window.

FIG. 15 is a flowchart illustrating a process of cancelling the minimum state of the display window. This process is also realized when the controller 130 executes a program stored in the storage unit 124. The flowchart of FIG. 15 is started with a state in which a display window is in the minimum state.

First, the controller 130 determines whether the user has started an operation of dragging the display window which is in the minimum state (in step S202). When it is determined that the dragging operation has been started (that is, when the determination is affirmative) in step S202, the controller 130 detects a direction of the dragging of the display window (in step S204).

Next, the controller 130 determines whether the operation of dragging the display window has been terminated (in step S206). When it is determined that the dragging operation has been terminated (that is, when the determination is affirmative) in step S206, the controller 130 detects a position of the display window at a time when the dragging operation is terminated (in step S208).

Next, the controller 130 determines whether a distance of the dragging performed on the display window in the dragging direction obtained at the time when the dragging operation is terminated satisfies the condition for cancelling the minimum state (in step S210). When it is determined that the cancellation condition is satisfied (that is, when the determination is affirmative) in step S210, the controller 130 further moves the display window in the dragging direction detected in step S204 (refer to FIG. 12) and displays the entire display window in the display screen (in step S212).

On the other hand, when it is determined that the cancellation condition is not satisfied (that is, when the determination is negative) in step S210, the controller 130 moves the display window in a direction opposite to the dragging direction and displays the display window in the minimum state (in step S214). Then this process is terminated.

According to the first embodiment described above, when the user's operation of dragging the display window Wi1 which is in the normal state toward an end of the screen (the right end R or the lower end D) is performed to move the display window Wi1, the display window Wi1 is minimized in a region at the end of the screen in the dragging direction. Accordingly, the user can minimize the display window in a desired position at an end of the display screen 111 depending on a state of the display window Wi2 displayed behind the display window Wi1 which is in the normal state.

Second Embodiment

In the first embodiment, when the state of the display window Wi1 is changed to the minimum state, the size of the display window Wi1 is maintained (refer to FIGS. 7 and 8). However, in a second embodiment, when a state of a display window Wi1 is to be changed to a minimum state, the display window Wi1 is changed to an icon obtained by reducing a size of the display window Wi1 and the icon is displayed in a region at an end of a display screen 111. By this, since a display region for displaying the display window Wi1 which is in the minimum state can be reduced, the display screen 111 can be more efficiently utilized.

Figure 16:
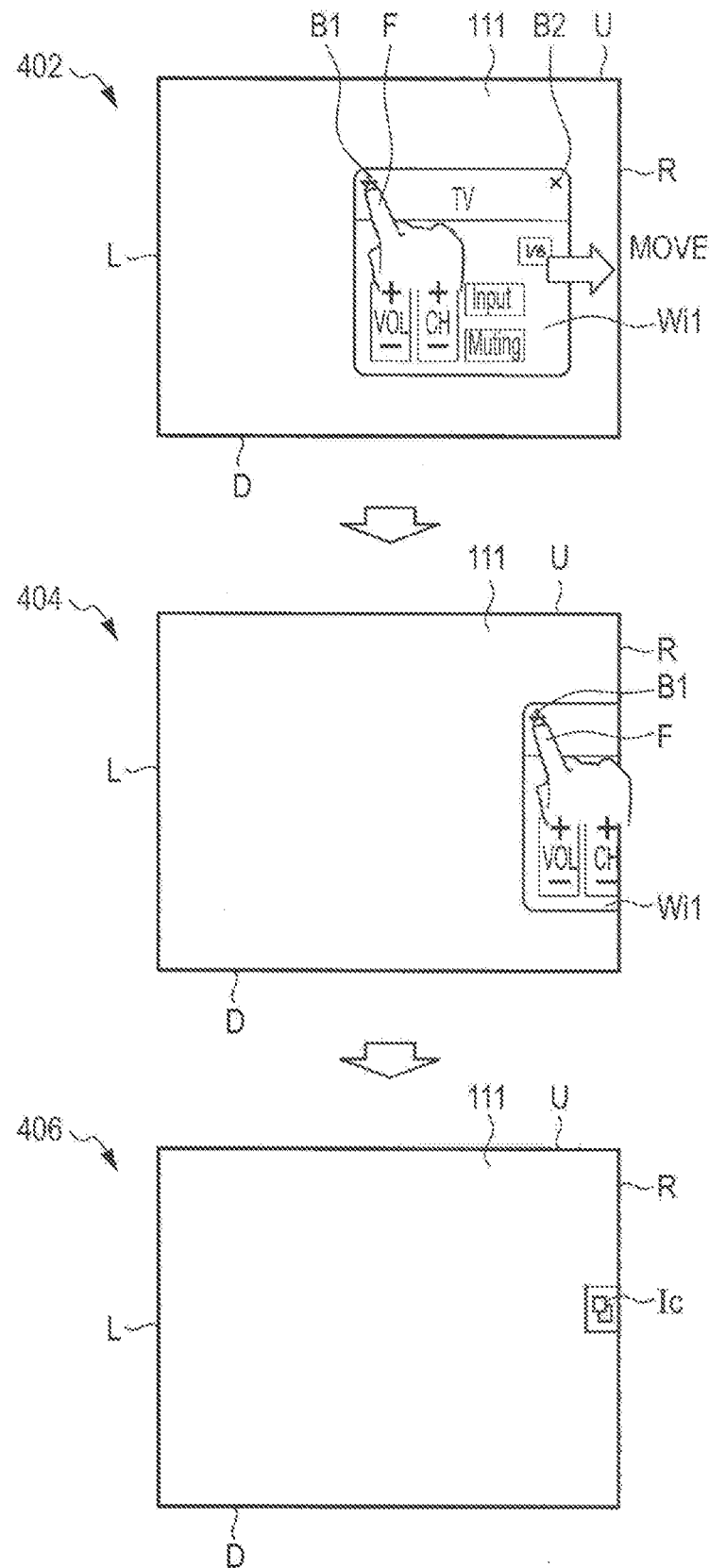
FIG. 16 is a diagram illustrating transition of a display window Wi1 changed to a minimum state according to a second embodiment.

FIG. 16 is a diagram illustrating transition to the minimum state of the display window Wi1 according to the second embodiment. In FIG. 16, as with the case of FIG. 8, the user performs a dragging operation toward a right end R while touching a movement icon B1 of a display window Wi2 by a finger F (state 402). Thereafter, when a position of the display window Wi1 obtained at a time when the dragging operation is terminated satisfies a first minimization condition or a second minimization condition (state 404), the display window Wi1 is displayed as an icon Ic (state 406).

In the second embodiment, cancellation of the minimum state of the display window Wi1 displayed as the icon is performed by tapping the icon Ic of the display window Wi1 by the finger F. When the icon is tapped, the icon display is changed to normal display, and the entire display window Wi1 is displayed in the display screen 111.

Third Embodiment

In a third embodiment, a plurality of display windows are minimized. Here, the display window has two minimum states, i.e., first and second minimum states. In the first minimum state, as with the case of the first embodiment, a portion of a display window is displayed while a size of the display window is maintained. In the second minimum state, as with the case of the second embodiment, the display window is displayed as an icon.

In the third embodiment, when the user performs a tapping operation on a predetermined icon of the display window after a state of the display window is changed to the first minimum state, the state of the display window is changed to the second minimum state. Specifically, a state in which a portion of the display window is displayed at an end of the display screen 111 is changed to a state in which an icon Ic obtained by reducing a size of the display window is displayed. By this, the user can select one of the first and second minimum states of the display window in accordance with a display state of the display screen (for example, a display state of another display window), and accordingly, a display method having higher user-friendliness can be provided.

Figure 17:
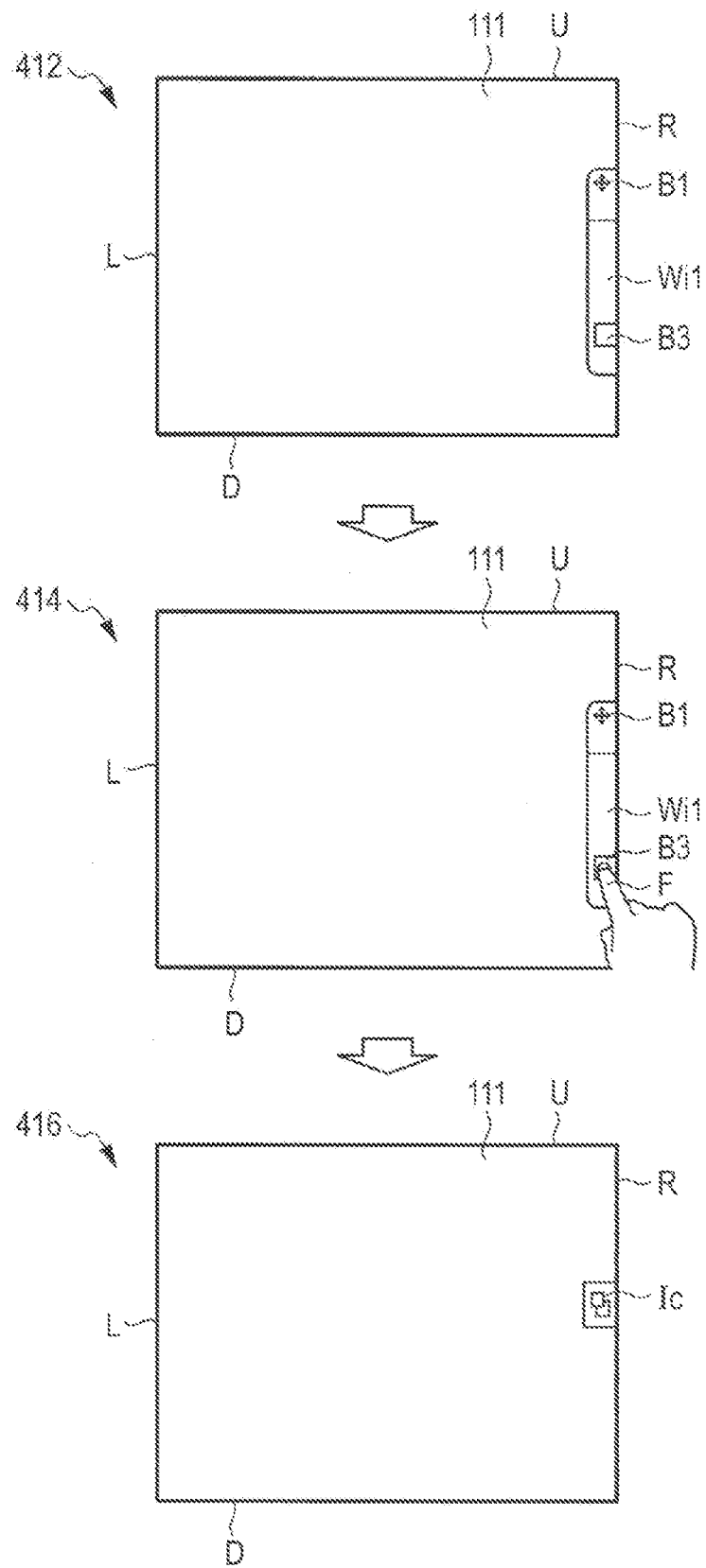
FIG. 17 is a diagram illustrating transition of a display window Wi1 from a first minimum state to a second minimum state according to a third embodiment.

FIG. 17 is a diagram illustrating transition from the first minimum state to the second minimum state of the display window Wi1 according to the third embodiment. The transition to the first minimum state of the display window Wi1 is performed by the method illustrated in FIG. 8. Note that, in the third embodiment, when the display window is displayed in the first minimum state, an icon B3 used to change the first minimum state of the display window to the second minimum state is additionally displayed (state 412). Then, when the icon B3 in the display window Wi1 which is in the first minimum state is tapped (state 414), the state of the display window Wi1 is changed from the first minimum state to the second minimum state (state 416).

In the third embodiment, cancellation of the minimization of the display window Wi1 which is in the first minimum state is performed by dragging the display window Wi1 similarly to the first embodiment (refer to FIGS. 12 and 13). Furthermore, as with the case of the second embodiment, cancellation of the minimization of the display window Wi1 which is in the second minimum state is performed by tapping the icon Ic so that the display window Wi1 which is in the normal state is displayed. Note that, when the icon Ic is tapped, the display may be changed to the first minimum state instead of display of the display window Wi1 which is in the normal state. In this case, the minimum state of the display window can be easily switched between the first and second minimum states.

Fourth Embodiment

In the first embodiment, the display window Wi1 is displayed in the minimum state at the lower end D or the right end R of the display screen. In the fourth embodiment, a display window is displayed in a minimum state in one of a lower end D, a right end R, a left end L, and an upper end U. Then, in the fourth embodiment, a position of a movement icon used to cancel minimization is changed in accordance with a position of a minimized display window in a display screen 111, that is, the movement icon is displayed in a region at an end of the display screen 111. By this, the display window can be easily minimized at an arbitrary side selected from among four sides of the display screen 111, and the minimization of the display window can be easily cancelled using the movement icon.

FIG. 18 is a diagram illustrating transition to a minimum state of a display window Wi1 according to the fourth embodiment. In FIG. 18, when a user drags the display window Wi1 toward the left end L while touching a movement icon B1 of the display window Wi1 (state 422), the display window Wi1 is minimized at the left end L (state 424). In this case, a display controller 138 changes a display position of the movement icon B1 when displaying the display window Wi1 in the minimum state. Specifically, as illustrated in the state 424 of FIG. 18, the movement icon B1 is displayed at an upper right corner of the display window. Accordingly, a window operation of cancelling the minimization of the display window minimized at the left end L of the display screen can be performed.

FIG. 19 is a diagram illustrating another transition to the minimum state of the display window Wi1 according to the fourth embodiment. In FIG. 19, when the user drags the display window Wi1 toward the upper end U while touching the movement icon B1 of the display window Wi1 (state 432), the display window Wi1 is minimized at the upper end U (state 434). Also in FIG. 19, the display controller 138 changes a display position of the movement icon B1 when displaying the display window Wi1 in the minimum state. Specifically, as illustrated in the state 434 of FIG. 19, the movement icon B1 is displayed at a lower left corner of the display window. This allows a window operation of cancelling the minimization of the display window minimized at the upper end U of the display screen to be performed.

Note that, when the display window Wi1 is minimized at the lower end D or the right end R of the display screen 111, the movement icon B1 is displayed in a region at an end of the screen without changing the position of the movement icon B1 (refer to FIGS. 7 and 8).

Fifth Embodiment

In a fifth embodiment, a display screen 111 includes a plurality of display regions. The plurality of display regions include, for example, a first display region in which a plurality of display windows are displayed in a superposed manner and a second display region in which shortcut icons of applications and the like are displayed. Then, in the fifth embodiment, a display window is minimized in a region at an end of the first display region.

FIG. 20 is a diagram illustrating transition to a minimum state of a display window Wi1 according to the fifth embodiment. As illustrated in FIG. 20, the display screen 111 includes first and second display regions 111a and 111b. The first display region 111a displays various display windows. Note that, in FIG. 20, although only the display window Wi1 is displayed in the first display region 111a, other display windows (display window Wi2, for example) are displayed in practice. In the second display region 111b, shortcut icons 111c of applications and an operation tray 111d used to display application trays are displayed. Note that items displayed in the second display region 111b are not limited to the operation tray 111d, and thumbnail images of photographs, for example, may be displayed.

When the user drags the display window Wi1 toward the second display region 111b while touching a movement icon B1 of the display window Wi1 displayed in the first display region 111a (state 442), the display window Wi1 is minimized at the lower end D of the first display region 111a (state 444). As described above, since the display window Wi1 is minimized at the lower end D of the first display region 111a, the second display region 111b is prevented from being occupied by the minimized display window Wi1. Especially, this technique is effective for an information processing apparatus, such a tablet terminal and a smartphone, which has limitation of space for the operation tray 111d.

CONCLUSION

When a user's input for moving a first display window toward an outside of the display screen 111 in a display state in which the first display window is displayed in the display screen 111 is obtained, the display controller changes the first display state to a second display state in which the first display window is displayed in a region at an end of the display screen 111 in accordance with a direction of a movement of the first display window. In this way, since the display window can be minimized and displayed in a desired position at an end of the display screen 111, operations can be performed on a second display window.

Although the movement icon B1 of the display window is touched when the display window is dragged in the first to fourth embodiments described above, the present technique is not limited to this. For example, an arbitrary point in the display window may be touched when the dragging operation is performed.

Furthermore, although the cancellation of the minimization of the display window which is in the minimum state is performed by dragging the display window in the first embodiment, the present technique is not limited to this. For example, a state of the display window may be changed to a normal state when an arbitrary point in the display window is tapped.

Furthermore, although the display window is minimized when the display window is dragged in the foregoing description, the present technique is not limited to this. For example, the minimization may be performed by a flicking operation performed on the display window.

Furthermore, although the tablet terminal 100 is taken as an example of an information processing apparatus in the foregoing description, the present technique is not limited to this. The information processing apparatus may be a smartphone. In a case of a smartphone, the smartphone is further subjected to the restriction of a size of a display screen. Therefore, in this case, the method for minimizing the display window by performing a dragging operation is efficiently employed. Furthermore, examples of the information processing apparatus include game machines, PDAS, and electronic dictionaries.

According to an embodiment of the present disclosure, there is described an information processing apparatus including
    a display controller for displaying a first display window which is displayable with a second display window in a display screen in a superposed manner, and
    an input obtaining unit for obtaining a user's input for moving the first display window in the display screen, wherein the display controller changes, when a user's input for moving the first display window toward an outside of the display screen is obtained in a first display state in which the first display window is displayed in the display screen, the state of the first display window to a second display state in which the first display window is displayed in a region at an end of the display screen in accordance with a direction of the movement of the first display window.

Furthermore, in the description of the information processing apparatus, the information processing apparatus further includes a determination unit for determining whether a position of the first display window which is moved toward the outside of the display screen in accordance with the user's input is within a predetermined range, wherein the display controller changes, when the determination unit determines that the position of the first display window is within the predetermined range, the state of the first display window to the second display state.

Furthermore, in the description of the information processing apparatus, the display controller changes, when it is determined that the center of the first display window protrudes the end of the screen, the state of the first display window to the second display state.

Moreover, in the description of the information processing apparatus, the display controller changes, when it is determined that an amount of a protrusion of the first display window from the end of the screen is larger than a predetermined threshold value, the state of the first display window to the second display state.

Furthermore, in the description of the information processing apparatus, the display controller displays, when the second display state is entered, a portion of the first display window in a region at the end of the screen while a size of the first display window is maintained.

Moreover, in the description of the information processing apparatus, the display controller changes, when the second display state is entered, the first display window to an icon obtained by reducing a size of the first display window and displays the icon in a region at the end of the screen.

Furthermore, in the description of the information processing apparatus, the display controller changes, when a user's input for the first display window is obtained in the second display state, the state of the first display window the portion of which is displayed at the end of the screen to a display state in which the first display window is displayed as an icon obtained by reducing a size of the first display window.

Moreover, in the description of the information processing apparatus, the display controller changes, when a predetermined user's input for the first display window which is in the second display state is obtained, the state of the first display window to the first display state.

Furthermore, in the description of the information processing apparatus, the predetermined user's input represents a movement of the first display window toward the center of the display screen, and the display controller changes, when an amount of the movement of the first display window toward the center is larger than a predetermined threshold value, the state of the first display window to the first display state.

Moreover, in the description of the information processing apparatus, the user's input is a touch operation for moving the first display window while the display screen is touched.

Furthermore, in the description of the information processing apparatus, the first display window includes a movement icon to be touched when the user moves the first display window, and the display controller changes, when the second display state in which a portion of the first display window is displayed in a region at the end of the screen is entered, a position of the movement icon so that the movement icon is displayed in the region at the end of the screen.

Moreover, in the description of the information processing apparatus, the user's input is an input of a user's voice for instructing a movement of the first display window.

Furthermore, in the description of the information processing apparatus, the user's input is an input operation performed by an external input device, and the input obtaining unit obtains the input operation through a communication unit which performs wireless communication with the external input device.

Moreover, in the description of the information processing apparatus, the display screen includes a first display region which displays the first display window and the second display window, and a second display region which displays an operation tray including icons, and the display controller changes, when a user's input for moving the first display window toward an outside of the first display region in the display screen is obtained, the state of the first display window to a second display state in which the first display window is displayed in a region at an end of the first display region in accordance with a direction of the movement of the first display window.

Furthermore, according to another embodiment of the present disclosure, there is described an information processing method including displaying a first display window which is displayable with a second display window in a display screen in a superposed manner, obtaining a user's input for moving the first display window toward an outside of the display screen, and changing, when the user's input is obtained, a state of the first display window to a display state in which the first display window is displayed in a region at an end of the display screen in accordance with a direction of the movement of the display window.

Moreover, according to another embodiment of the present disclosure, there is described a storage medium storing programs which cause a computer to execute displaying a first display window which is displayable with a second display window in a display screen in a superposed manner, obtaining a user's input for moving the first display window toward an outside of the display screen, and changing, when the user's input is obtained, a state of the first display window to a display state in which the first display window is displayed in a region at an end of the display screen in accordance with a direction of the movement of the display window.

While the preferred embodiments of the present disclosure have been described in detail hereinabove with reference to the accompanying drawings, a technical range of the present disclosure is not limited to the disclosed exemplary embodiments. Specifically, it is to be understood that, as is well known to those skilled in the art, various modification, combinations, and other embodiments may be made depending on designs or other elements within the scope of the claims and equivalents of the claims.

REFERENCE SIGNS LIST

100: tablet terminal
110: display unit
111: display screen
111a: first display region
111b: second display region
112: touchpad
130: controller
132: input obtaining unit
134: position obtaining unit
136: determination unit
138: display controller

The invention claimed is:

1. A method implemented by a terminal including a display screen and circuitry, the method comprising:
controlling display of a first display window on the display screen, the first display window having a movement element;
obtaining a user input through the movement element for moving the first display window on the display screen by directly touching and moving the movement element by the user input;
moving a relative location of the movement element within the first display window based on a position of the first display window on the display screen; and
moving the first display window, by the user input through the movement element, to a left edge of the display screen, and based on position of the first display window being at the left edge of the display screen, moving the move element to an upper-rightmost corner of the first display window.

2. The method of claim 1, further comprising:
displaying the movement element in a region at an end of the display screen, after the relative location of the movement element is moved.

3. The method of claim 1, further comprising:
displaying a portion of the first display window at an edge of the display screen.

4. The method of claim 3, wherein the movement element is displayed in the displayed portion of the first display window.

5. The method of claim 1, further comprising:
displaying a portion of the first display window at the left edge of the display screen.

6. The method of claim 1, further comprising:
displaying a portion of the first display window at a right edge of the display screen.

7. The method of claim 1, further comprising:
controlling transition of the displayed portion of the first display window into an icon that is displayed.

8. The method of claim 1, further comprising:
after receiving a user input, controlling transition of the displayed portion of the first display window into an icon that is displayed.

9. The method of claim 8, wherein the user input is a touch operation.

10. The method of claim 1, wherein when a user input on the display screen does not satisfy a condition, the first display window is moved in a direction opposite to a direction in which the first display window was dragged.

11. A terminal comprising:
a display screen; and
circuitry configured to:
control display of a first display window on the display screen, the first display window having a movement element,
obtain a user input through the movement element for moving the first display window on the display screen by directly touching and moving the movement element by the user input,
move a relative location of the movement element within the first display window based on a position of the first display window on the display screen; and
move the first display window, by the user input through the movement element, to a left edge of the display screen, and based on position of the first display window being at the left edge of the display screen, move the move element to an upper-rightmost corner of the first display window.

12. The terminal of claim 11, wherein the circuitry is further configured to display the movement element in a region at an end of the display screen, after the relative location of the movement element is moved.

13. The terminal of claim 11, wherein the circuitry is further configured to display a portion of the first display window at an edge of the display screen.

14. The terminal of claim 13, wherein the movement element is displayed in the displayed portion of the first display window.

15. The terminal of claim 11, wherein the circuitry is further configured to display a portion of the first display window at the left edge of the display screen.

16. The terminal of claim 11, wherein the circuitry is further configured to display a portion of the first display window at a right edge of the display screen.

17. The terminal of claim 11, wherein the circuitry is further configured to control transition of the displayed portion of the first display window into an icon that is displayed.

18. The terminal of claim 11, wherein the circuitry is further configured to control, after receiving a user input, transition of the displayed portion of the first display window into an icon that is displayed.

19. The terminal of claim 18, wherein the user input is a touch operation.

20. The terminal of claim 11, wherein when a user input on the display screen does not satisfy a condition, the circuitry is configured to move the first display window in a direction opposite to a direction in which the first display window was dragged.

21. A non-transitory, computer-readable medium storing instructions that, when executed by a terminal including a display screen and circuitry, control the terminal to implement a method comprising:
controlling display of a first display window on the display screen, the first display window having a movement element;

obtaining a user input through the movement element for moving the first display window on the display screen by directly touching and moving the movement element by the user input;

moving a relative location of the movement element within the first display window based on a position of the first display window on the display screen; and moving the first display window, by the user input through the movement element, to a left edge of the display screen, and based on position of the first display window being at the left edge of the display screen, moving the move element to an upper-rightmost corner of the first display window.

\* \* \* \* \*